United States Patent
Eldridge

(10) Patent No.: US 7,054,767 B2
(45) Date of Patent: May 30, 2006

(54) THERMAL MASS FLOWMETER APPARATUS AND METHOD WITH TEMPERATURE CORRECTION

(75) Inventor: Mark F. Eldridge, Monterey, CA (US)

(73) Assignee: Eldridge Products, Inc., Monterey (CA)

( * ) Notice: Subject to any disclaimer, the term of this patent is extended or adjusted under 35 U.S.C. 154(b) by 0 days.

(21) Appl. No.: 10/776,321

(22) Filed: Feb. 12, 2004

(65) Prior Publication Data

US 2005/0109100 A1 May 26, 2005

(51) Int. Cl.
*G01F 17/00* (2006.01)

(52) U.S. Cl. ................................. 702/50; 73/170.12

(58) Field of Classification Search ................ 702/50, 702/47, 100, 53, 55, 56, 99, 130, 133; 73/204.25–26, 73/204.18, 861.01, 861.65, 170.12, 204.26; 340/608

See application file for complete search history.

(56) References Cited

U.S. PATENT DOCUMENTS

| | | | |
|---|---|---|---|
| 3,366,942 A | 1/1968 | Deane | 340/243 |
| 3,995,481 A * | 12/1976 | Djorup | 73/170.12 |
| 4,475,388 A | 10/1984 | Kawai et al. | 73/204 |
| 4,807,151 A * | 2/1989 | Citron | 702/47 |
| 5,031,126 A | 7/1991 | McCulloch et al. | |
| 5,237,523 A * | 8/1993 | Bonne et al. | 702/100 |
| 5,263,369 A | 11/1993 | Cutler et al. | |
| 5,435,180 A | 7/1995 | Uchiyama et al. | |
| 5,460,039 A | 10/1995 | Cutler et al. | |
| 5,544,531 A | 8/1996 | Heckman | 73/861.01 |
| 5,854,425 A | 12/1998 | Sarma et al. | |
| 5,913,250 A | 6/1999 | Wible | 73/861.65 |
| 6,230,560 B1 * | 5/2001 | Suzuki | 73/204.25 |
| 2003/0212510 A1 * | 11/2003 | Gee | 702/50 |
| 2004/0025585 A1 * | 2/2004 | Seki et al. | 73/204.26 |

FOREIGN PATENT DOCUMENTS

EP    1 314 966 A1    5/2003

* cited by examiner

*Primary Examiner*—Michael Nghiem
*Assistant Examiner*—Xiuqin Sun
(74) *Attorney, Agent, or Firm*—Birch, Stewart, Kolasch & Birch, LLP

(57) ABSTRACT

A thermal mass flowmeter with temperature correction. The flowmeter includes a bridge, a signal conditioner, and a balancer. The balancer provides a bridge signal as feedback to the bridge that balances a flow sensor signal and the temperature sensor signal from the bridge. The flow sensor signal or the temperature sensor signal are adjusted by an overheat factor and a temperature correction factor. The temperature correction factor is determined using a predetermined function of a temperature of the fluid. Methods of determining parameters of the predefined function and using the flowmeter for determining a flow rate of the fluid are disclosed. The flowmeter provides device for determining a flow rate of a fluid over a wide range of temperature and flow rates as well as providing device for determining the temperature of the fluid.

58 Claims, 20 Drawing Sheets

THERMAL MASS FLOWMETER APPARATUS AND METHOD WITH TEMPERATURE CORRECTION

CROSS-REFERENCE TO RELATED APPLICATIONS

This is the first application filed for the present invention.

TECHNICAL FIELD

The present application relates to a flowmeter and in particular to a thermal mass flowmeter with temperature correction.

BACKGROUND OF THE INVENTION

Thermal mass flowmeters are a common choice for flow metering devices in the commercial and industrial metering markets. A typical sensor element for use in such meters is a resistance temperature detector (RTD), the resistance of which is related to the temperature of the element itself. A typical bridge employs two RTD elements. One of them is referred to as a temperature sensor element and is unheated. An flow sensor RTD element is heated and the effect of mass flow on the heated element provides a measure of the flow velocity of the fluid in a flow tube being monitored. The temperature of the fluid, normally a gas, flowing across the heated RTD is also a factor in the amount of heat dissipated from that RTD.

Two different methods are commonly used to determine the mass flow in a conduit. One is configured to maintain a constant temperature differential between the temperature sensor RTD and the flow sensor RTD. This method measures a bridge signal, such as a voltage or current, required to maintain the flow sensor RTD at a constant temperature above the temperature sensor RTD while heat is removed from the active RTD by way of the physical properties of the flowing fluid. The other method measures a signal difference between the flow sensor RTD and the temperature sensor RTD while the flow sensor RTD is self-heated by a constant current or a constant power heat source. During this measurement, as with the other method, the active RTD loses heat by way of the physical properties of the flowing media.

There are many configurations of dispersion mass flow sensors, and more particularly, of heated RTD type sensors. An early such flow detector is taught in U.S. Pat. No. 3,366,942, "Flow Stoppage Detector," issued Jan. 30, 1968 to Deane. This patent discloses a reference sensor, a heated or active sensor, and a separate heating element located closely adjacent the heated sensor element. The basic principal of operation of dispersion flowmeters is discussed in this patent. There are many other examples of detectors employing differential temperature sensors, some having three elements as described in the patent mentioned above, and some having two elements, where the active sensor is self-heated. Even a single element differential temperature sensor may be employed. The single element sensor works on a time sharing basis where it acts as a reference sensor part of the time and is then heated to act as the active sensor in relatively rapid succession.

Most of the known differential temperature sensors are configured with the temperature and flow sensors arranged as a Wheatstone Bridge. They are mounted in the fluid conduit and project into the flow path as an insertion flow sensor. The sensor elements are positioned to permit unobstructed flow fluid past both the flow sensor and the temperature sensor in such a way that one does not thermally influence the other. This means that the temperature sensor must indeed be a reference with respect to the fluid being sensed without influence from the heat of the flow sensor or the fluid heated by the heated sensor.

U.S. Pat. No. 4,475,388, "Thermal Flowmeter with Temperature Compensation," issued Oct. 9, 1984 to Kawai et al. provides a method for measuring the flow rate of a fluid. A signal of the fluid flow rate and a signal of the fluid temperature are produced by using the signals from an electric heater and a first, second, and third temperature-dependent resistors in a signal processing circuit. The produced signals are supplied to a computer circuit to carry out modification, linearization, and multiplication by a conversion constant for linearization which is corrected regarding temperature characteristic.

U.S. Pat. No. 5,544,531, "Flowmeter Having Active Temperature Compensation," issued Aug. 13, 1996 to Heckman, provides a method and apparatus for measuring fluid flow characterized by compensating for temperature variations in the fluid level pressure transducer. The transducer is operated at a plurality of different combinations of pressure and temperature, and the drive and output voltages of the transducer are measured at each combination. A plurality of temperature coefficients are derived from the measured voltage and entered into a data logger for use in calculating flow.

U.S. Pat. No. 5,237,523, "Flowmeter Fluid Composition and Temperature Correction," issued Aug. 17, 1993 to Bonne et al., provides a method for correcting the flow measurement of a fluid for changes in the composition and temperature of that fluid in a flowmeter of a hot element type in which an uncorrected flow value signal for the fluid of interest in relation to a hot element sensor output is corrected by applying a first correction factor to the output based on certain unique physical parameters of the fluid of interest which nominally include thermal conductivity, specific heat, and temperature, obtaining an uncorrected flow measurement value from the corrected output and obtaining the corrected flow measurement by applying a second correction factor to the uncorrected flow measurement value based on the unique physical parameters.

In this art, there is a concern in the previously proposed arrangements for determining a flow rate of the fluid to a high degree of accuracy over a wide temperature range and flow rate. While the prior techniques improve the accuracy of the flow rate determination over a somewhat narrow temperature range, a flowmeter having high accuracy over a wide temperature and flow rate range would be highly desirable.

SUMMARY OF THE INVENTION

It is an object of the present invention to provide a thermal mass flow meter having high accuracy over a wide temperature and flow rate range.

According to one aspect of the invention there is provided a thermal mass flowmeter comprising means for providing a flow ratio signal and a temperature ratio signal, the flow ratio signal and the temperature ratio signal having a ratio of proportionality that changes with temperature; means for applying an overheat factor to the flow ratio signal or the temperature ratio signal, means for applying a temperature correction factor to the flow ratio signal or the temperature ratio signal, the temperature correction factor being determined by a predefined function of a temperature of a fluid, and means for disproportionately balancing the flow ratio signal and temperature ratio signal when the ratio of proportionality changes with temperature.

According to another aspect of the invention there is provided a method of calibrating a thermal mass flowmeter, the method comprising the steps of sequentially operating the flowmeter with a fluid at two or more predetermined temperatures and at a predetermined fluid flow rate, determining respective values of a temperature calibration factor at each temperature, and determining parameters of a function using the respective values of the temperature calibration factor and values of the temperature, wherein the function defines a relationship between the temperature of the fluid and a temperature correction factors, and wherein the step of determining respective values of the temperature calibration factor comprises a step of balancing a flow ratio signal and a temperature ratio signal at each temperature using the respective temperature calibration factor.

According to still another aspect of the invention there is provided a method for determining a flow rate of a fluid comprising the steps of: thermally connecting a bridge to the fluid, conditioning signals from the bridge using a signal conditioner to provide a flow sensor signal and a temperature sensor signal, wherein a ratio of proportionality between the flow sensor signal and the temperature sensor signal changes over a temperature range; applying an overheat factor to the flow sensor signal or the temperature sensor signal, applying a temperature correction factor determined by a predefined function of a temperature of the fluid to the flow sensor signal or the temperature sensor signal, wherein the overheat factor corrects for a changing ratio of proportionality between the flow sensor signal and the temperatuee sensor signal resulting from changes in temperature; applying a temperature correction factor, determined by a predefined function of a temperature of the fluid, the temperature correction factor being applied to the flow sensor signal or the temperature sensor signal; and balancing the ratio of proportionality between the flow sensor signal and the temperature sensor signal as the ratio of proportionality changes with temperature by providing a bridge signal to the bridge.

Advantageously, the invention provides means for determining a flow rate of a fluid over a wide range of temperature and flow rates.

BRIEF DESCRIPTION OF THE DRAWINGS

Further features and advantages of the present invention will become apparent from the following detailed description, taken in combination with the appended drawings, in which:

FIG. 8b is a schematic diagram of a bridge and a signal conditioner shown in FIG. 8a;

FIG. 8c is a schematic diagram of a balancer shown in FIG. 8a;

FIG. 9b is a schematic diagram of a bridge and a signal conditioner shown in FIG. 9a;

FIG. 9c is a schematic diagram of a balancer shown in FIG. 9a;

It will be noted that throughout the appended drawings, like features are identified by like reference numerals.

DETAILED DESCRIPTION OF THE PREFERRED EMBODIMENT

Figure 1:
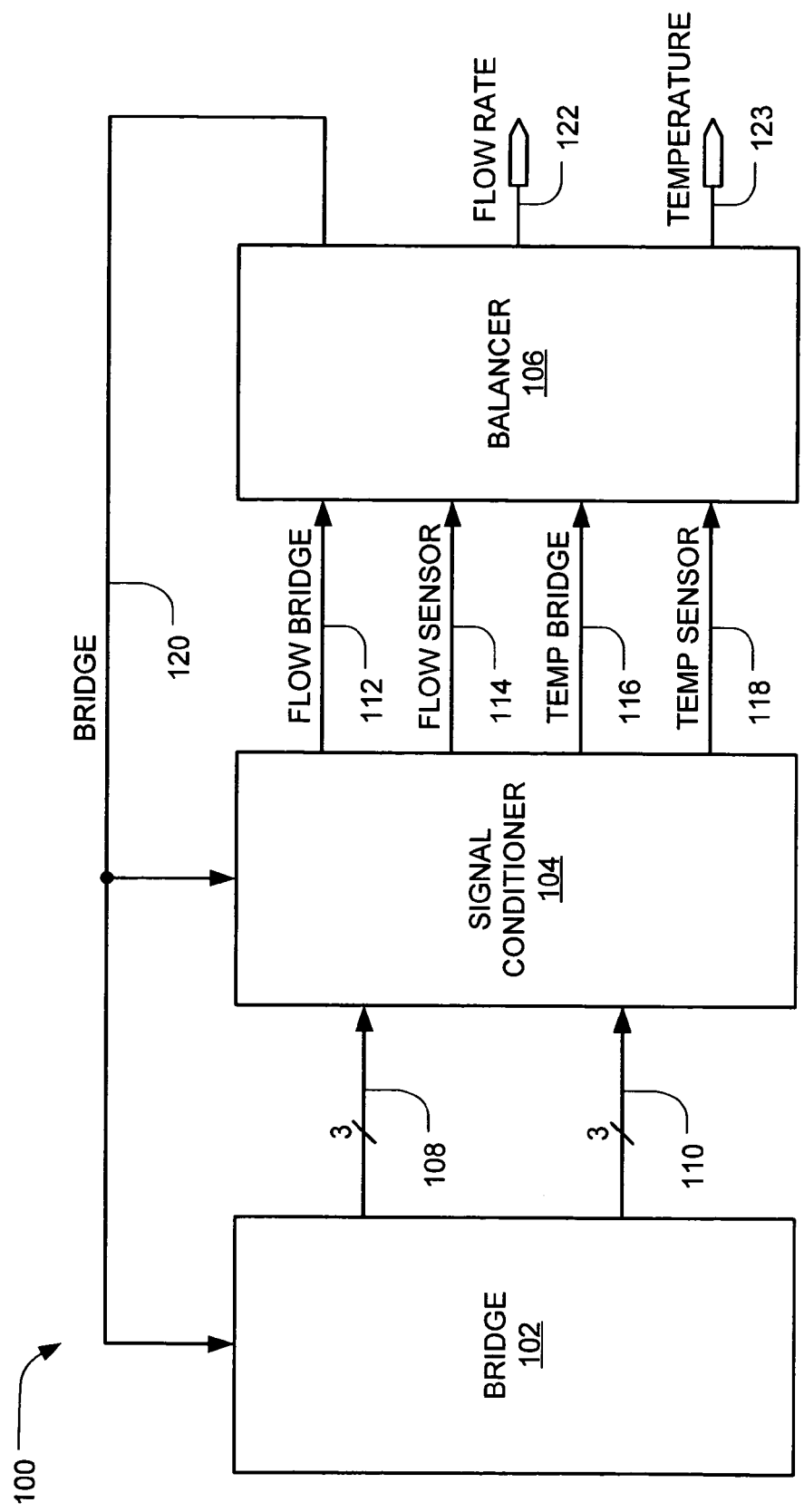
FIG. 1 is a block diagram of a preferred embodiment of a flowmeter in accordance with the present invention.
Figure 2A:
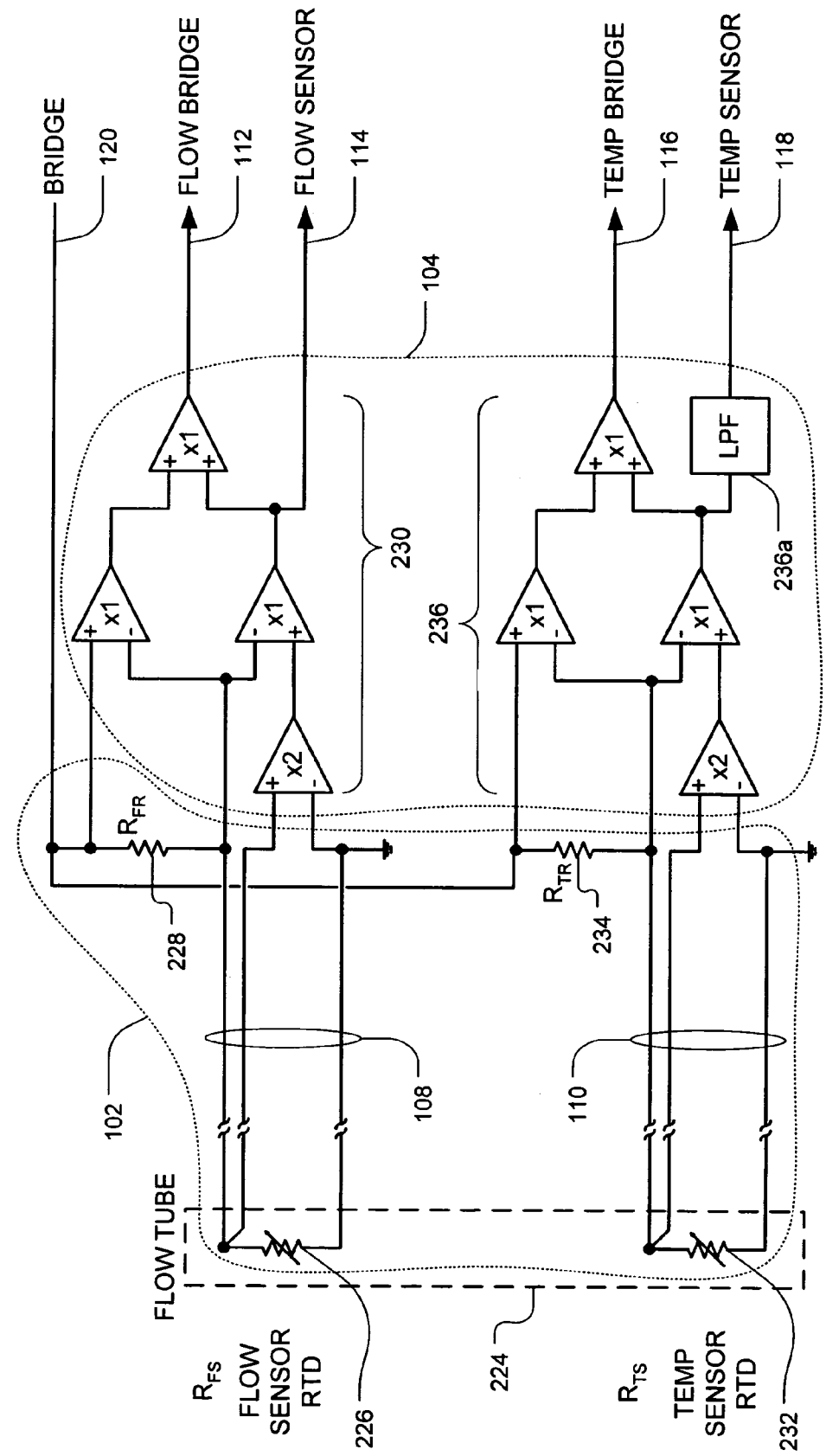
FIG. 2a is a schematic diagram of a bridge and a signal conditioner shown in FIG. 1.
Figure 2B:
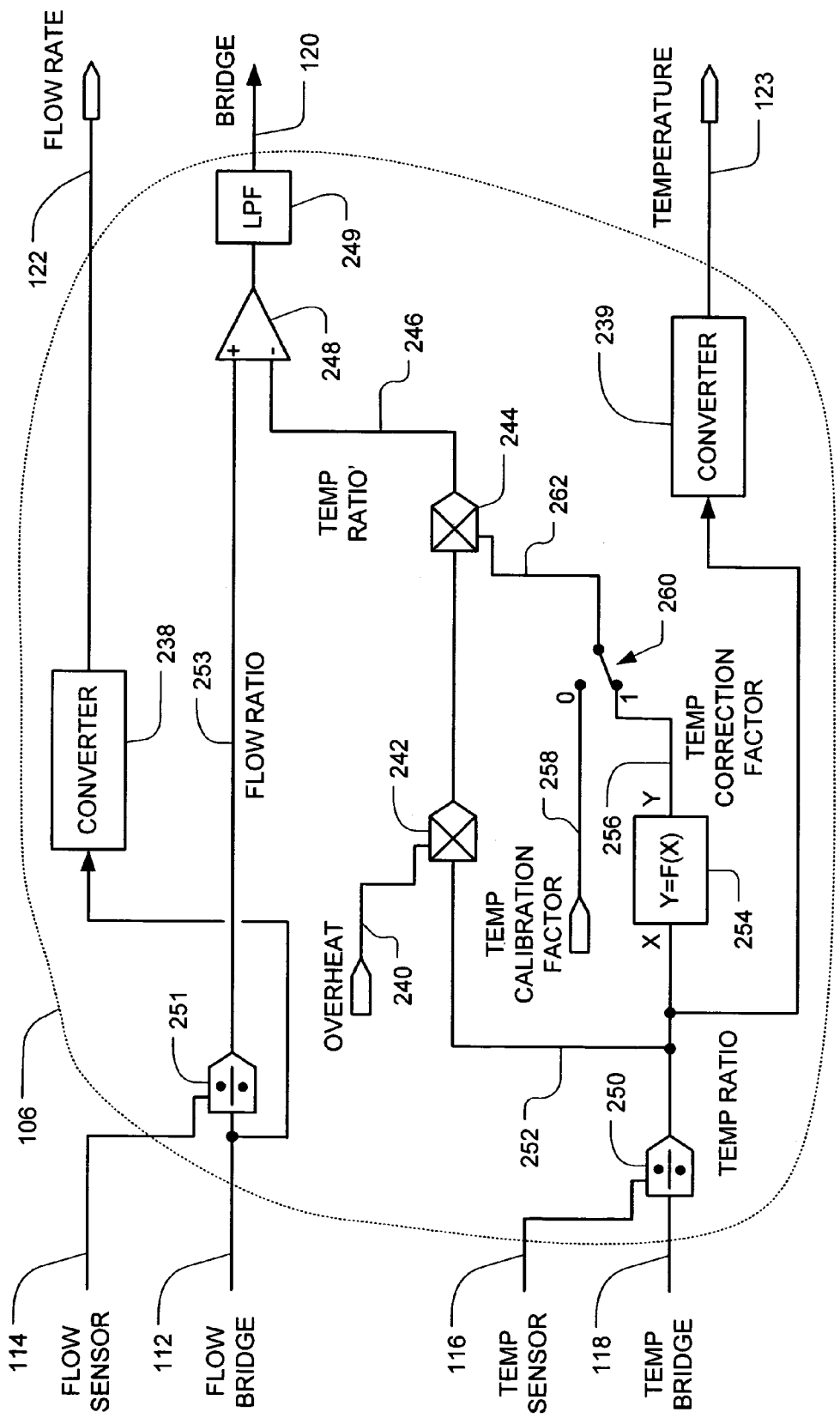
FIG. 2b is a schematic diagram of a balancer shown in FIG. 1.
Figure 2C:
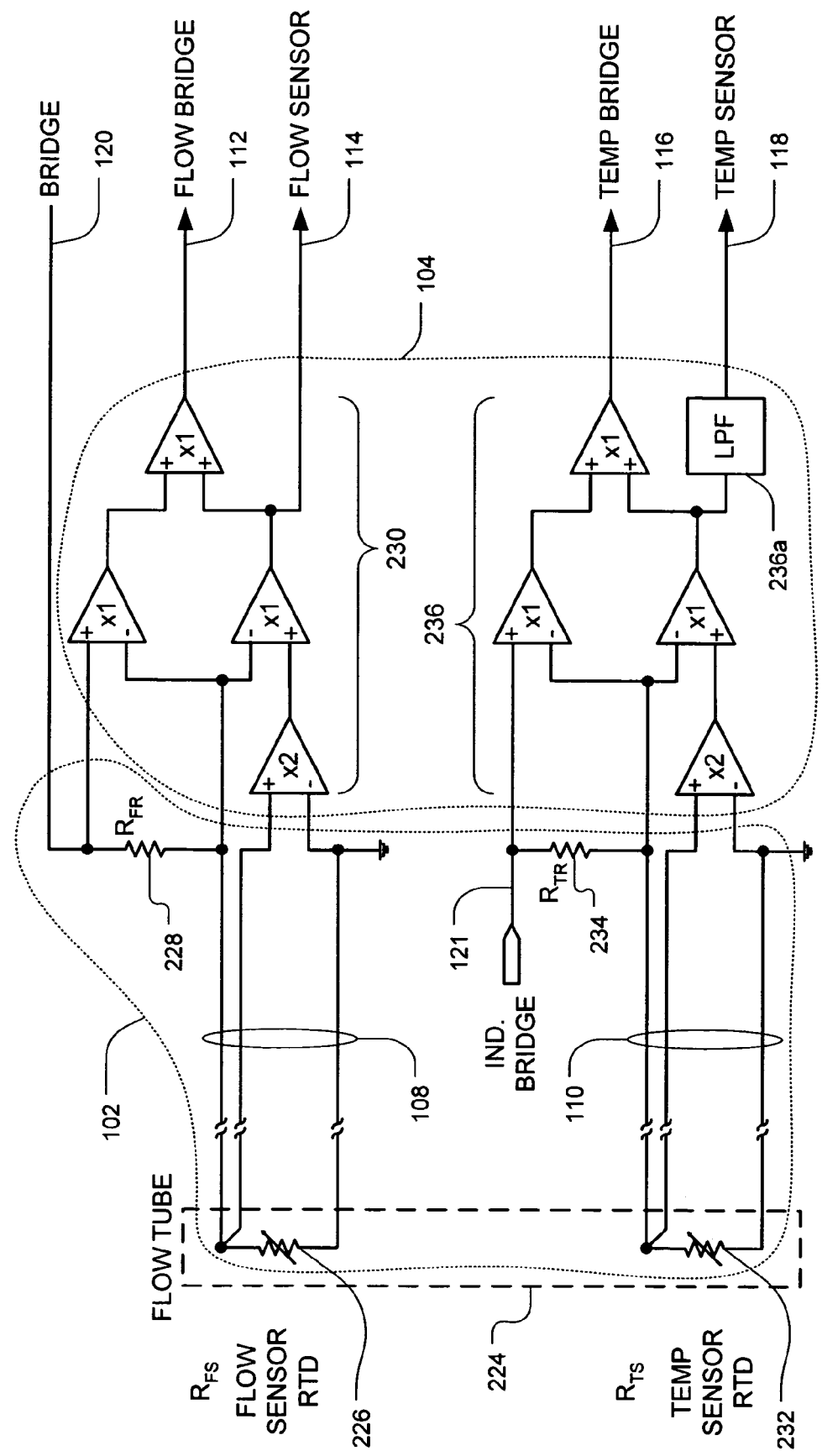

Referring now to FIGS. 1, 2a, and 2b, a preferred embodiment of a flowmeter 100 in accordance with the present invention will now be described.

The flowmeter 100 includes a bridge 102, a signal conditioner 104, and a balancer 106. The bridge 102 includes two signal dividers: a flow sensor divider comprising a flow reference impedance 228, and a flow sensor resistive temperature detector (RTD) 226; and a temperature sensor divider comprising a temperature reference impedance 234, and a temperature sensor RTD 232. The flow sensor RTD 226 and the temperature sensor RTD 232 are preferably platinum RTD's having a positive temperature coefficient. Alternatively, the flow sensor RTD 226 and the temperature sensor RTD 232 may be thermistors having a negative temperature coefficient or any other temperature dependent impedance known in the art. Each signal divider divides a bridge signal 120 according to a relative impedance of the reference impedances 228,234 and the respective flow sensors 226,232. The flow sensor RTD 226 and the temperature sensor 232 are locatable in a flow tube 224 and thermally connectable to a fluid having a flow rate and a temperature. The flow tube 224 may be remotely locatable with respect to the reference impedances 228,234 and the signal conditioner 104. The flow sensors 226,232 are preferably connected to the reference impedances 228,234 by respective three-wire connections 108,110 to facilitate the remote location of the flow tube 224.

Alternatively, the flow sensor RTD 226, the flow reference impedance 228, the temperature sensor RTD 232, and the temperature reference impedance 234 may be arranged to operate as a Wheatstone bridge (not shown).

A value of the flow reference impedance ($R_{FR}$) 228, a value of the flow sensor RTD ($R_{FS}$) 226, a value of the temperature reference impedance ($R_{TR}$) 234, and a value of the temperature sensor RTD ($R_{TS}$) 232 are chosen so that a ratio of $R_{FR}$:$R_{FS}$ is substantially equal to a ratio of $R_{TR}$:$R_{TS}$ at a predetermined ambient temperature. Furthermore, the value of the flow reference impedance 228, the value of the flow sensor RTD 226, the value of the temperature reference impedance 234, and a value of the temperature sensor RTD 232 are chosen so that a sum of $R_{FR}+R_{FS}$ is substantially less than a sum of $R_{TR}+R_{TS}$ at the predetermined ambient temperature. In the preferred embodiment shown in FIG. 2a exemplary values of $R_{FR}$, $R_{FS}$, $R_{TR}$, and $R_{TS}$ are 20 Ω, 200 Ω, 200 Ω, and 2 kΩ respectively.

In operation, the values chosen facilitate self-heating of the flow sensor RTD 226. The flowing fluid in the flow tube 224 absorbs heat from the flow sensor RTD 226. The bridge signal 120 is provided by the balancer 106, described in detail herein below, as a feedback signal and is adapted to maintain a relationship between the ratio of the value of the flow reference impedance 228 to the value of the flow sensor RTD 226 and the ratio of the value of the temperature reference impedance 234 to the value of the temperature sensor RTD 232. When the flow rate of the fluid changes, the bridge signal 120 changes accordingly in order to compensate for a change in heat absorption from the flow sensor RTD 226. A flow rate 122 is determined using an amount of power supplied to the bridge 102 in order to maintain the relationship between the ratio of the value of the flow reference impedance 228 to the value of the flow sensor RTD 226 and the ratio of the value of the temperature reference impedance 234 to the value of the temperature sensor RTD 232. The determination of the flow rate 122 is further described herein below.

The signal conditioner 104 receives signals from the flow sensor three-wire connection 108 and the bridge signal 120. A sensor signal conditioner 230 cancels losses in the flow sensor three-wire connection 108 and provides a flow bridge signal 112 and a flow sensor signal 114. The flow bridge signal 112 is substantially equal to a sum of a signal of the flow sensor RTD 226 plus a signal of the flow reference impedance 228. The flow sensor signal 114 is substantially equal to the signal of the flow sensor RTD 226. Similarly, a temperature signal conditioner 236 cancels losses in the temperature sensor three-wire connection 110 and provides a temperature bridge signal 116 and a temperature sensor signal 118. The temperature bridge signal 116 is substantially equal to a sum of a signal of the temperature sensor RTD 232 plus a signal of the temperature reference impedance 234. The temperature sensor signal 118 is substantially equal to the signal of the temperature sensor RTD 232. An optional low-pass filter 236a on the temperature sensor signal 118 provides greater system stability.

Referring now to FIG. 2b, the temperature sensor signal 116 is divided by the temperature bridge signal 118 at a divider 250 to provide a temperature ratio signal 252. Then an overheat factor 240 is applied to the temperature ratio signal 252 using a multiplier 242 and a temperature calibration/correction factor 262 is also applied using a multiplier 244 providing a temperature sensor' signal 246. While application of various correction factors throughout this application are shown using multipliers (or multiplication) those skilled in the art will also appreciate that dividers (or division) may also be used and still be within the scope of the invention. The overheat factor 240 is a predetermined constant that determines a difference in temperature of the temperature sensor RTD 232 and the flow sensor RTD 226. It should be noted that the application of the overheat factor 240 and the temperature calibration/correction factor 262 may be executed in any order and still be within the scope of the invention. An operational amplifier 248 is adapted to provide the bridge signal 120 so that both inputs, the flow ratio signal 253 and the temperature ratio' signal 246, to the operational amplifier 248 are made substantially equal. An optional low-pass filter 249 on the bridge signal 120 provides greater system stability. The temperature ratio 252 is a substantially linear function of the temperature of the fluid in the flow tube 224. A predefined function (Y=F(X)) 254 of the temperature ratio 252 provides a temperature correction factor 256 that is independent of the flow rate of the fluid in the flow tube 224. The predefined function 254 may be, for example, a linear, piece-wise linear, quadratic, cubic or any order of polynomial. Parameters of the predefined function 254 are determined using a method of calibrating the flowmeter 100 described herein below. A calibration mode switch 260 selects a temperature calibration factor 258 when the flowmeter 100 is in a calibration mode (switch position zero) or the temperature correction factor 256 when the flowmeter is in a normal operation mode (switch position 1, as shown in FIG. 2b).

A flow rate signal 122 is provided by a flow rate converter 238 using the flow bridge signal 112 which is a substantially linear function of the amount of power supplied to the bridge excluding losses in the connections 108,110. The flow rate signal 122 may be adapted, for example, to drive a digital or analog display (not shown), or interface to any external instrumentation (not shown). Alternatively, the flow rate signal 122 may be adapted to operate a relay (not shown) for controlling any apparatus. In yet another alternative embodiment (not shown) the flow rate signal 122 is provided by the flow rate converter 238 using the bridge signal 120. This embodiment is useful when losses in the three-wire connection 108 are negligible. In the preferred embodiment shown in FIG. 2b the flow bridge signal 112 is substantially equivalent to the bridge signal 120 when the losses in the three-wire connections 108,110 are negligible.

A temperature signal 123 is provided by a temperature converter 239 using the temperature ratio signal 252 which is a substantially linear function of the temperature of the fluid in the flow tube 224. In a manner similar, to the flow rate converter 238, the temperature signal 123 may be adapted to drive a digital or analog display (not shown), or interface to any external instrumentation (not shown).

Figure 3:
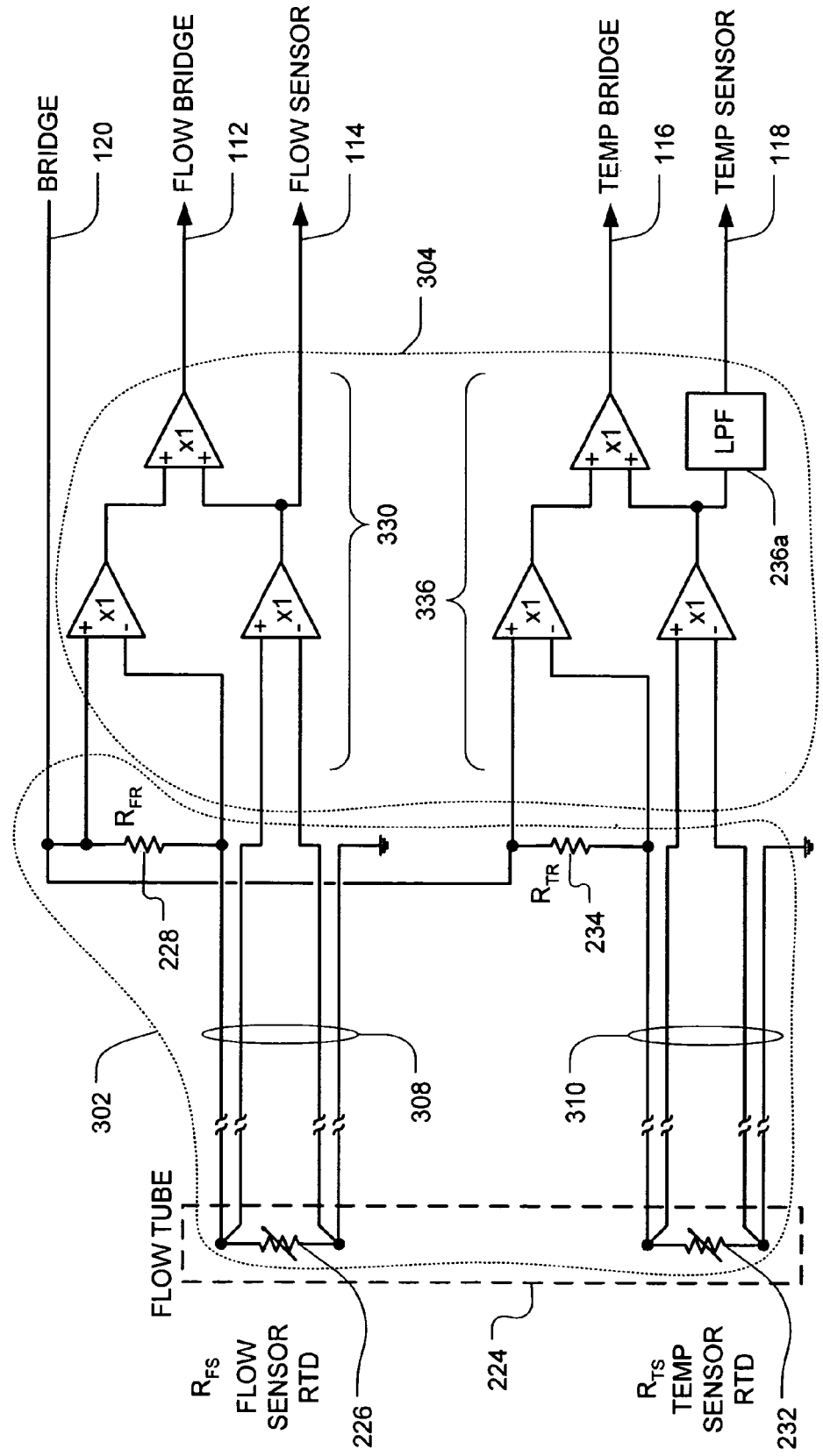
FIGS. 3, 4, and 5 are schematic diagrams of alternative embodiments of the bridge and signal conditioner shown in FIG. 1.

FIG. 3 shows alternative embodiments of the bridge 102 and signal conditioner 104 shown in FIG. 1. The operation of a bridge 302 and a signal conditioner 304 shown in FIG. 3 is similar to the operation of the bridge 102 and the signal conditioner 104 shown in FIG. 2a, a four-wire flow connection 308 and four-wire temperature connection 310 are used instead of the respective three-wire connections 108, 110. Also, a flow signal conditioner 330 and a temperature signal conditioner 336 are adapted to provide the identical flow bridge signal 112, flow sensor signal 114, temperature bridge signal 116, and temperature signal 118 as shown in FIG. 2a.

Figure 4:
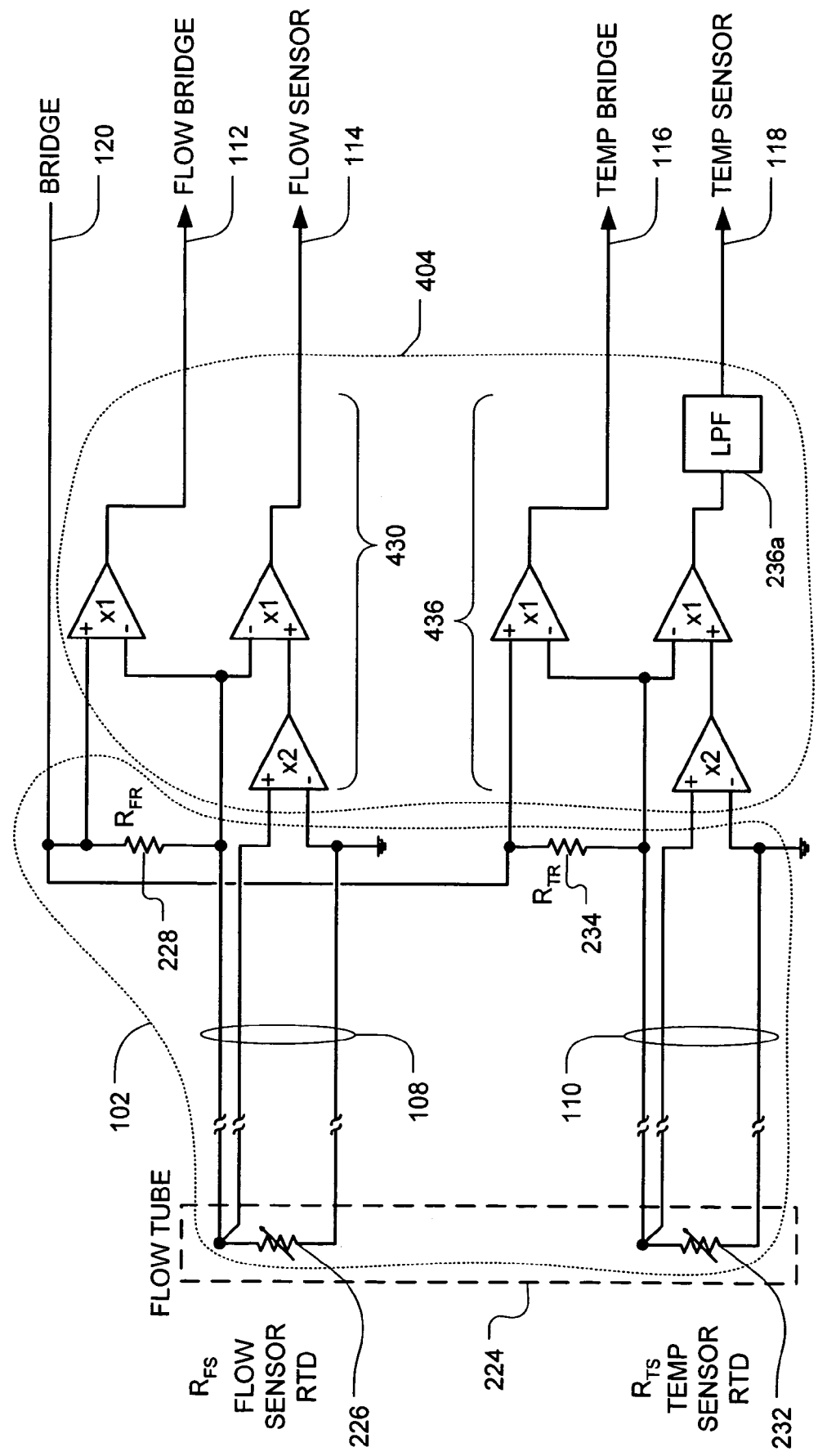

Referring now to FIG. 4, there is shown another alternative embodiment of the signal conditioner 104 shown in FIG. 1. A flow signal conditioner 430 is adapted to provide a flow bridge signal 112 and flow sensor signal 114 wherein the flow bridge signal 112 is substantially equal to the signal of the flow reference impedance 228 and a flow sensor signal 114 is substantially equal to the signal of the flow sensor RTD 226. Also, a temperature signal conditioner 436 is adapted to provide the temperature bridge signal 116 and the temperature sensor signal 118 wherein the temperature bridge signal 116 is substantially equal to the signal of the temperature reference impedance 234 and the temperature sensor signal 118 is substantially equal to the signal of the temperature sensor RTD 232.

Figure 5:
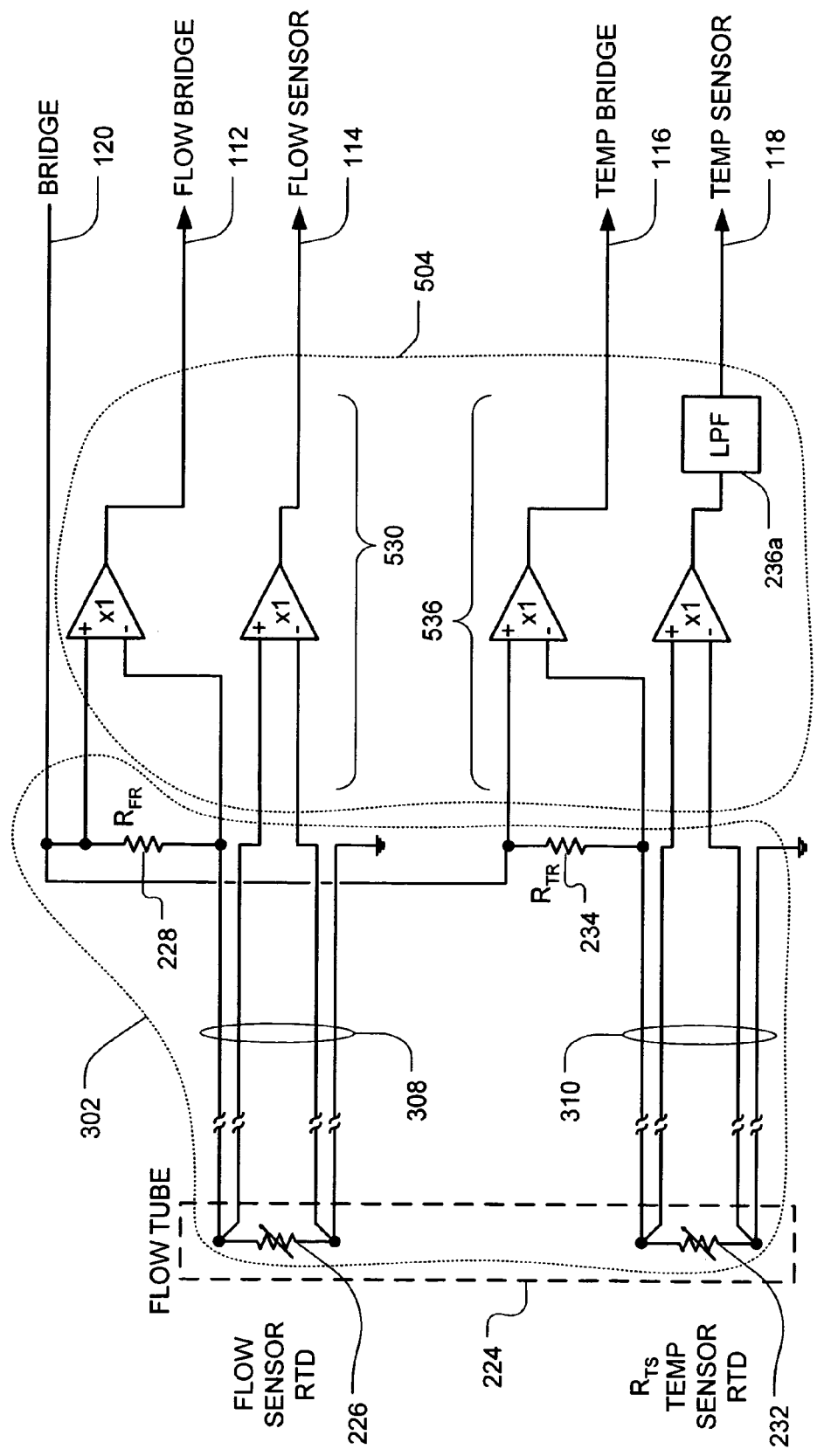

FIG. 5 shows yet another alternative embodiment of the signal conditioner 104 shown in FIG. 3. Similar to FIG. 4, a flow signal conditioner 530 is adapted to provide the flow bridge signal 112 and the flow sensor signal 114 wherein the flow bridge signal 112 is substantially equal to the signal of the flow reference impedance 228 and the flow sensor signal 114 is substantially equal to the signal of the flow sensor RTD 226. Also, a temperature signal conditioner 536 is adapted to provide the temperature bridge signal 116 and the temperature sensor signal 118 wherein the temperature bridge signal 116 is substantially equal to the signal of the temperature reference impedance 234 and the temperature sensor signal 118 is substantially equal to the signal of the temperature sensor RTD 232. In the embodiments shown in FIGS. 4 and 5 a sum of the flow bridge signal 112 plus the flow sensor signal 114 is substantially equivalent to the bridge signal 120 when the respective losses in the three-wire connection 108 and four-wire 308 are negligible.

Figure 6:
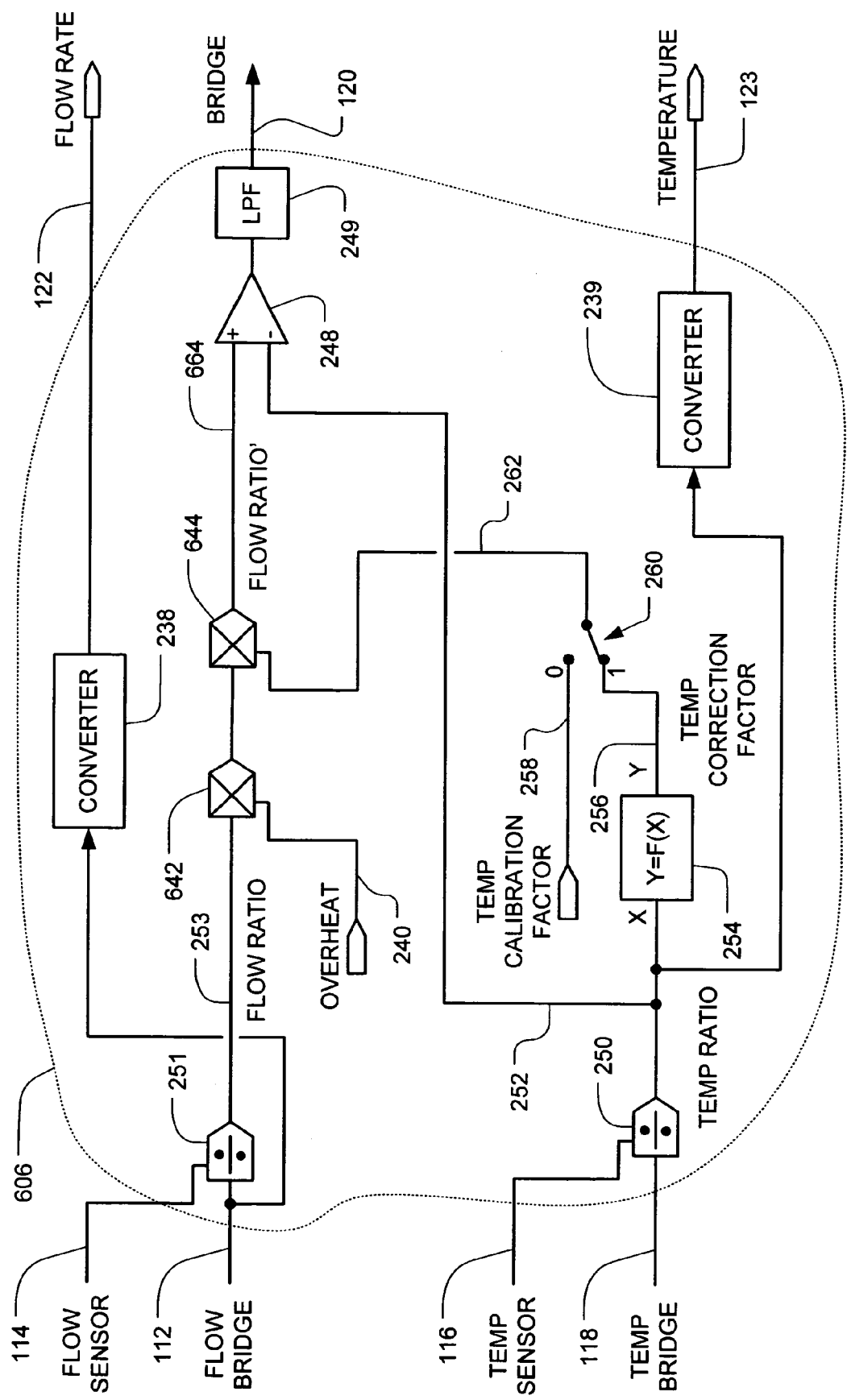
FIGS. 6 and 7 are schematic diagrams of alternative embodiments of the balancer shown in FIG. 1.

Turning now to FIG. 6, there is shown an alternative embodiment of the balancer 106 shown in FIG. 2b. The operation of this embodiment is similar to the operation of the embodiment shown in FIG. 2b except that the overheat factor 240 is applied to the flow ratio signal 253 by a multiplier 642 and the temperature calibration/correction factor 262 is applied to the flow ratio signal 253 by a multiplier 644 providing a flow sensor' signal 664. In a manner similar to the embodiment shown in FIG. 2b, the operational amplifier 248 is adapted to provide the bridge signal 120 so that both inputs, the flow ratio signal' 664 and the temperature ratio signal 252, to the operational amplifier 248 are made substantially equal. Furthermore, it should be noted that the overheat factor 240 and temperature calibration/correction factor 262 may be applied to any combination of the flow ratio signal 253 and temperature ratio signal 252 and still be within the scope of the invention.

Figure 7:
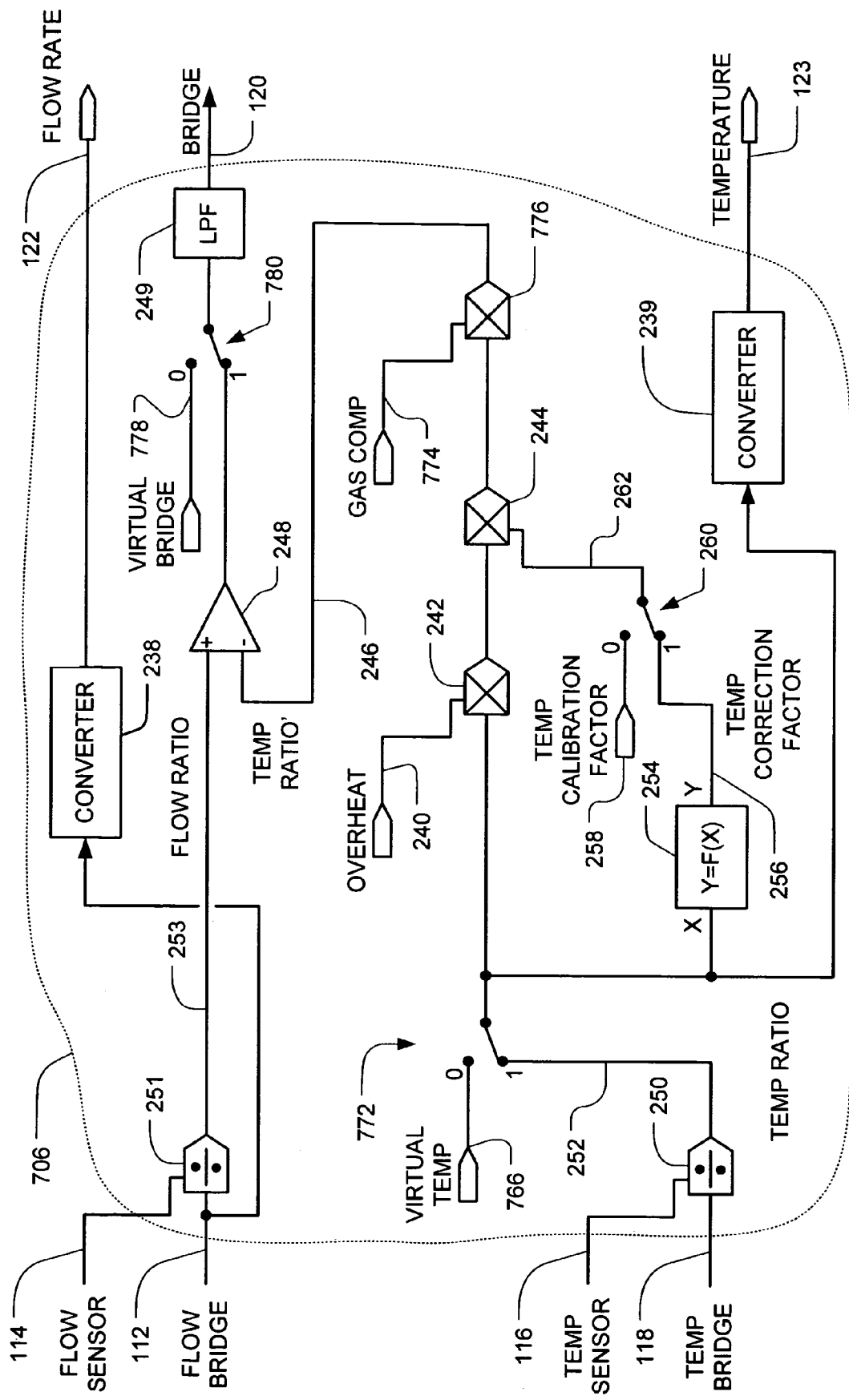

FIG. 7 shows yet another alternative embodiment of the balancer 106 shown in FIG. 2b. The operation of the embodiment shown in FIG. 7 is similar to the operation of the embodiment shown in FIG. 2b except that means for substituting a virtual temperature signal 766 for temperature sensor signal 116 has been added. The virtual temperature signal 766 is multiplied by the bridge signal 120 by a multiplier 768. An optional low-pass filter 770 provides greater system stability. A temperature mode switch 772 provides means for choosing the temperature sensor signal 116 or the virtual temperature signal 766 which allows operation of the flowmeter 100 for testing purposes without thermally connecting the bridge 102 to a fluid.

Also, a gas compensation factor 774 is applied to the temperature sensor signal 116 by a multiplier 776. The gas compensation factor 774 provides means for compensating for different fluid densities and other fluid properties.

Furthermore, a virtual bridge signal 778 can be substituted for the bridge signal 120 using a bridge signal mode switch 780 to facilitate testing.

Figure 8A:
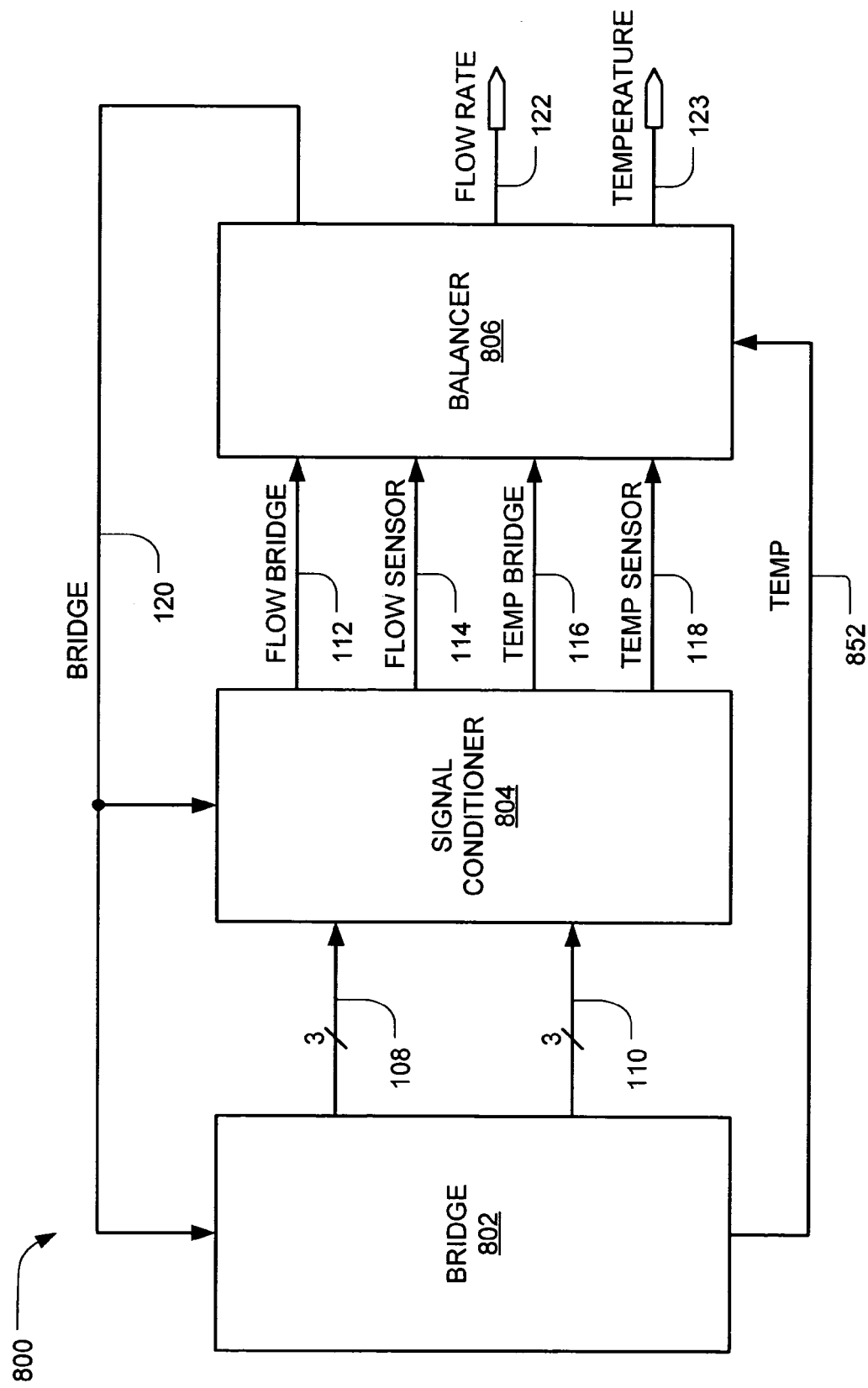
FIG. 8a is a block diagram of an alternative embodiment of a flowmeter in accordance with the present invention.
Figure 8B:
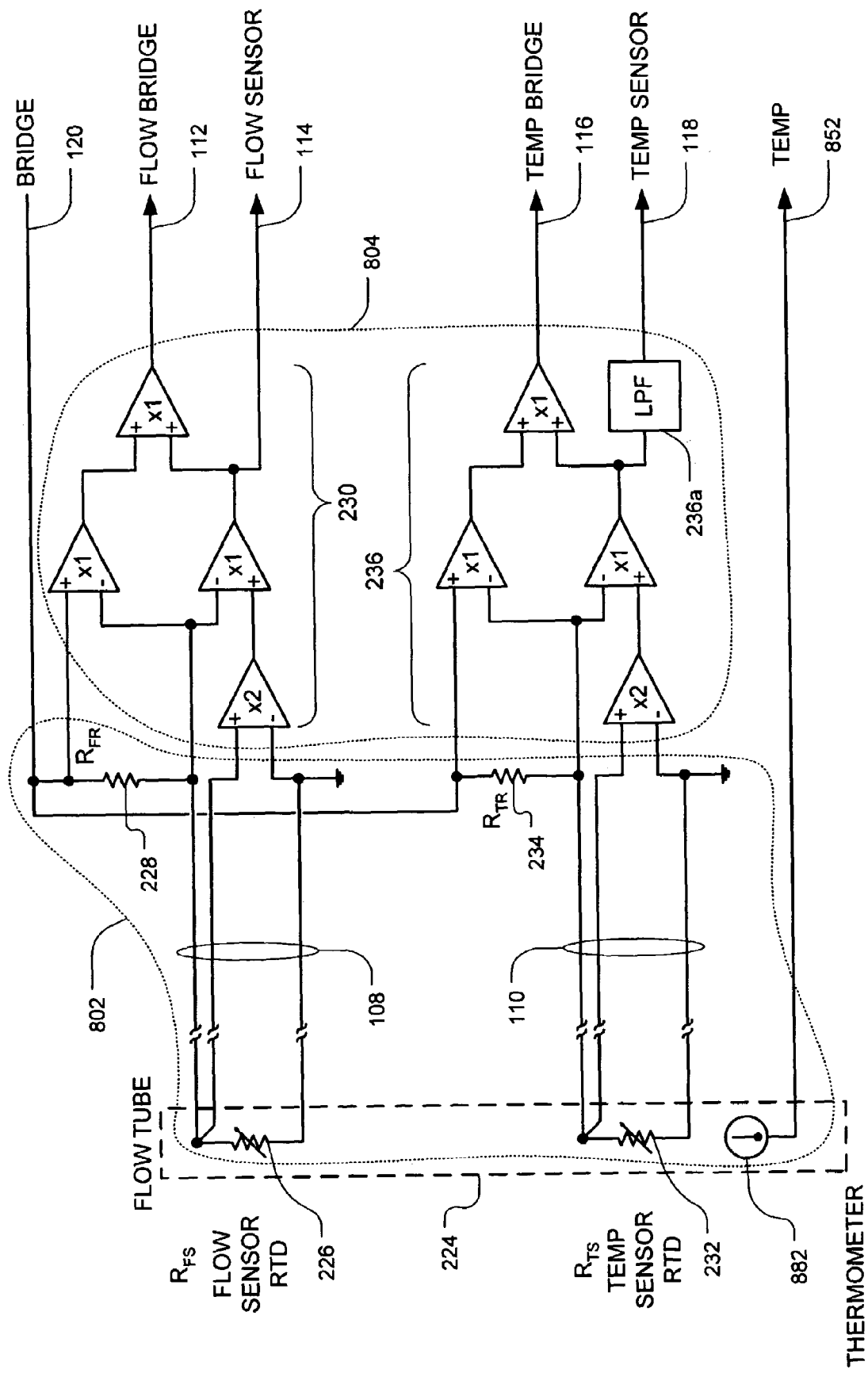
Figure 8C:
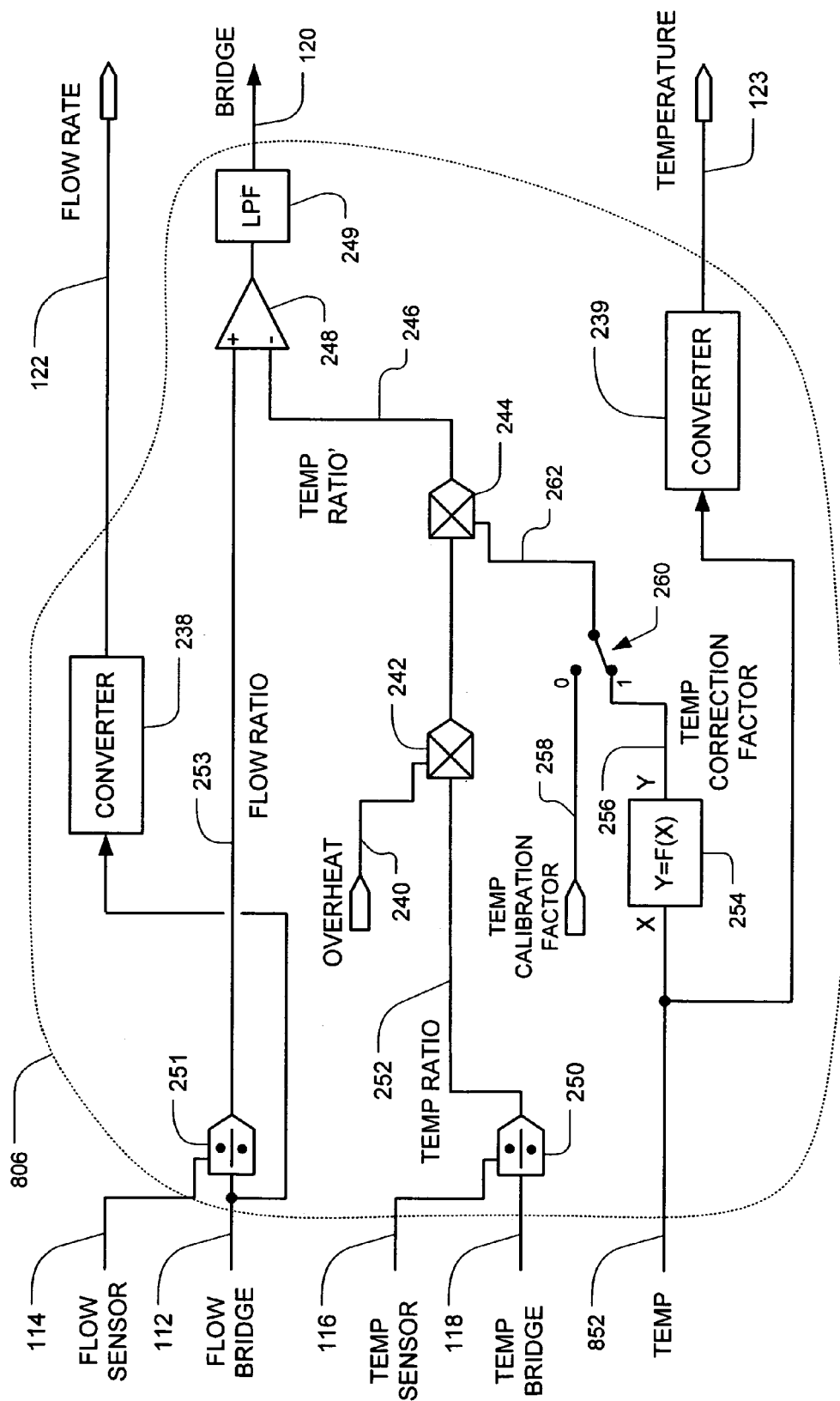

In FIG. 8a there is shown a block diagram of an alternative embodiment of a flow meter 800 in accordance with the present invention. FIG. 8b shows a schematic diagram of a bridge 802 and a signal conditioner 804 shown in FIG. 8a. FIG. 8c shows a schematic diagram of a balancer 806 shown in FIG. 8a. The operation of the bridge 802 is similar to the operation of the bridge 102 and the signal conditioner 104 respectively (FIG. 2a) except that except that a thermometer 882 thermally connected to the fluid flowing in the flow tube 224 providing an alternate temperature signal 852. The thermometer 882 may be, for example, a temperature dependent impedance driven by a current source. Alternatively, the alternate temperature signal 852 may be provided by an external instrument (not shown). The operation of the signal conditioner 804 is identical to the signal conditioner 104 shown in FIG. 1. The operation of a balancer 806 is similar to the operation of the balancer 106 shown in FIG. 2b except that the alternate temperature signal 852 is used as an input to the function 254 instead of the temperature ratio 252.

Figure 9A:
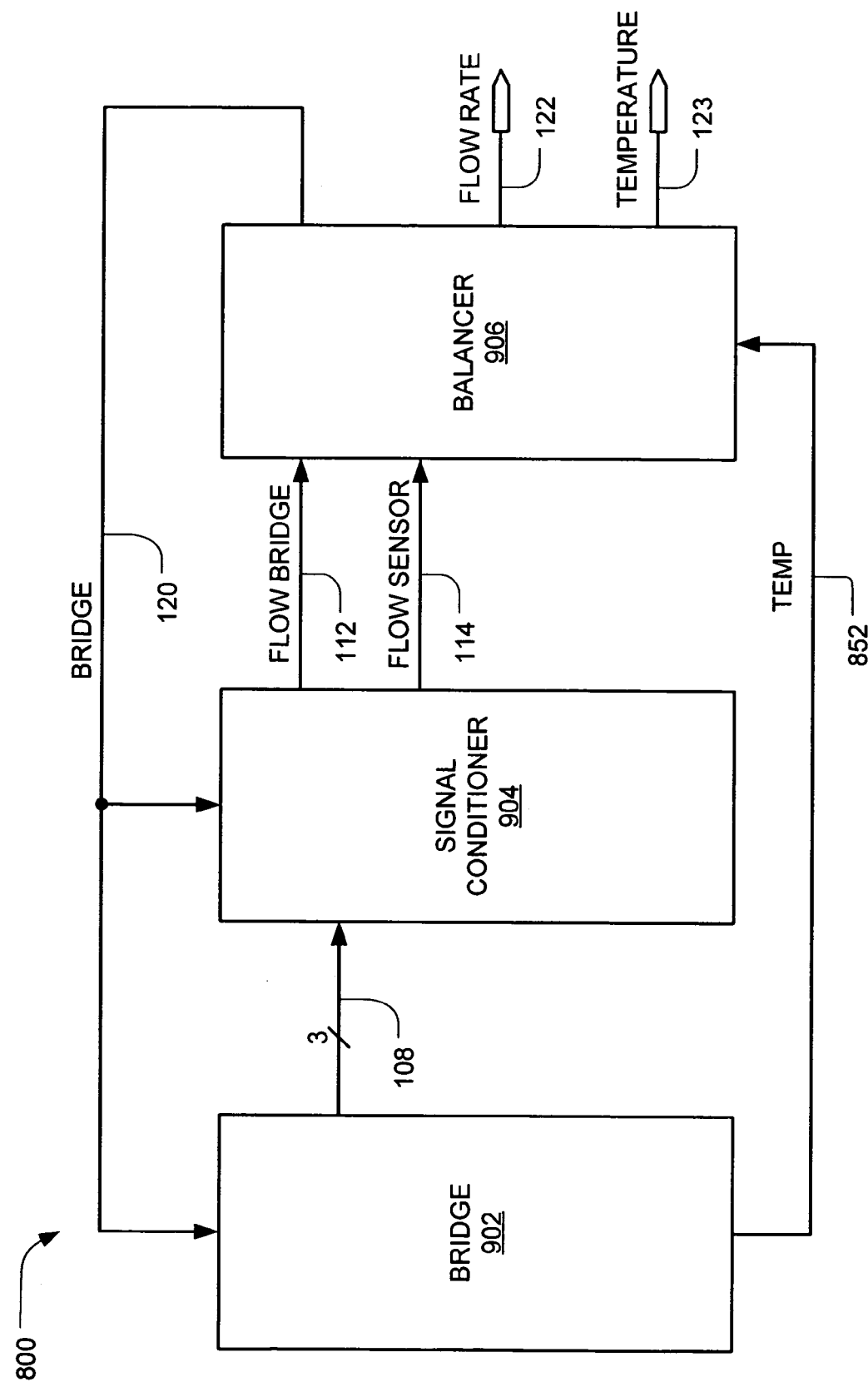
FIG. 9a is a block diagram of another alternative embodiment of a flowmeter in accordance with the present invention.
Figure 9B:
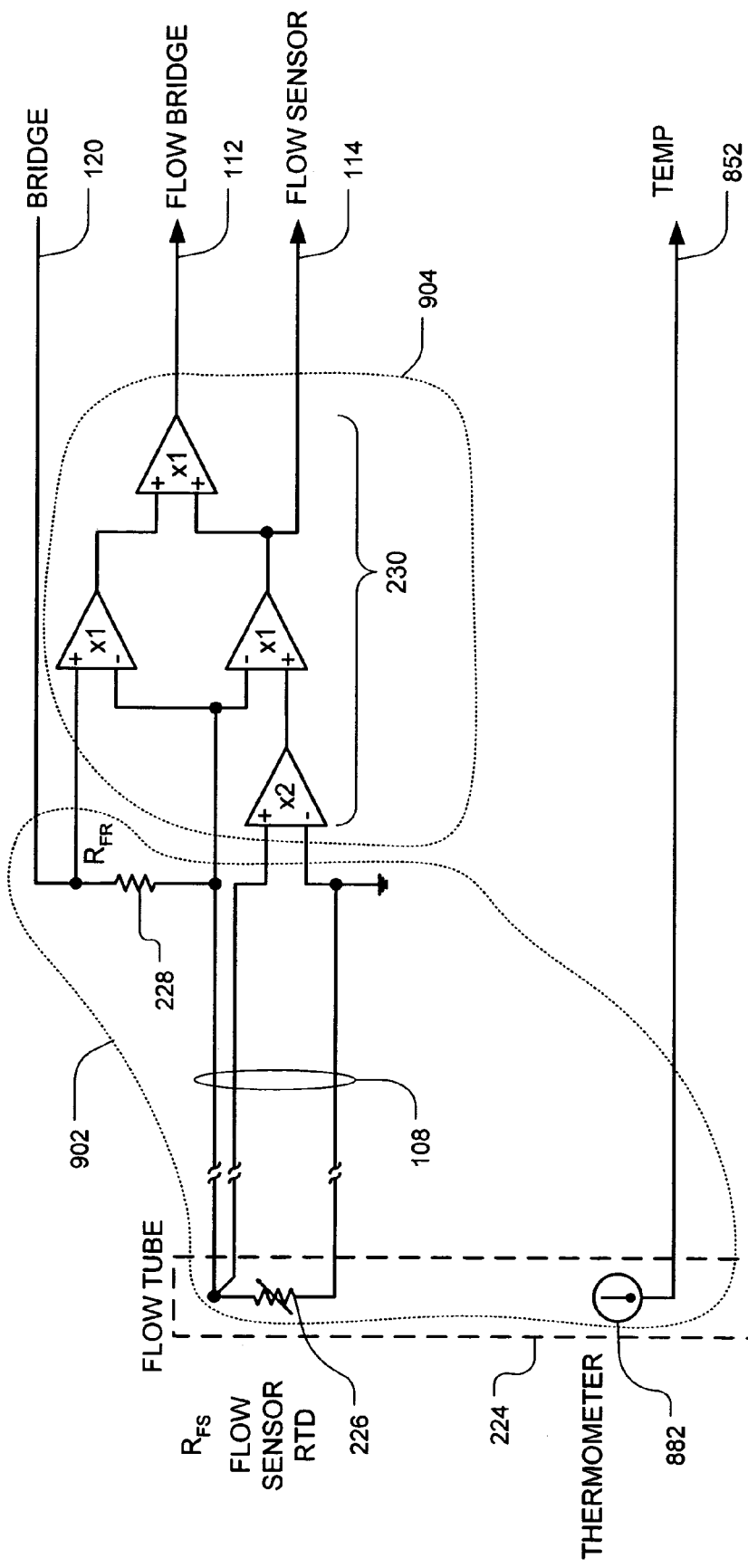
Figure 9C:
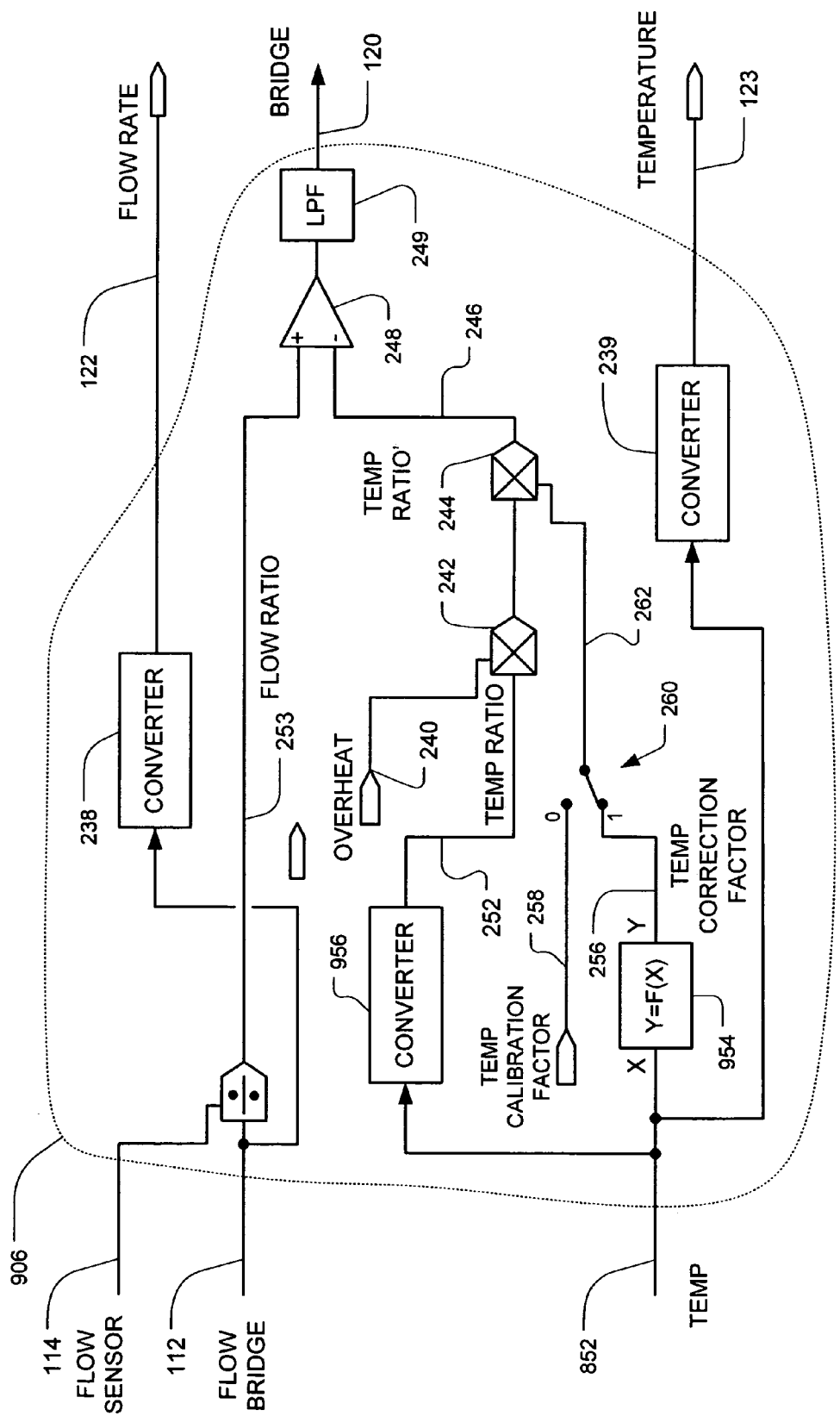

In FIG. 9a there is shown a block diagram of another alternative embodiment of a flow meter 900 in accordance with the present invention. FIG. 9b shows a schematic diagram of a bridge 902 and a signal conditioner 904 shown in FIG. 9a. It should be noted that the term "bridge" refers, in this application, not only to a dual divider circuit driven by a single source (FIGS. 2a, 3, 4, 5, and 8b) but also dual or single divider circuits driven by independent sources. FIG. 9c shows a schematic diagram of a balancer 906 shown in FIG. 9a. The operation of the bridge 902 and the signal conditioner 904 is similar to the operation of the bridge 802 and the signal conditioner 804 respectively (FIG. 8b) except that except that the temperature sensor RTD 232, the three-wire connection 110, the temperature reference impedance 234 and the temperature signal conditioner 836 have been eliminated. The operation of a balancer 906 is similar to the operation of the balancer 806 shown in FIG. 8c except that the temperature sensor signal 116, temperature bridge signal 118, and divider 250 have been eliminated. A temperature ratio converter 956 provides the temperature ratio 252 using the alternate temperature. The temperature ratio 252 is a substantially linear function of the alternate temperature 852. A predefined function 954 of the alternate temperature 852 is adapted to provide the temperature correction factor 256. The predefined function 954 is similar to the predefined function 254 shown in FIG. 2b and its parameters are determined using the same method described herein below.

The present invention also provides a method for calibrating a thermal mass flowmeter. A preferred embodiment of the method will be described with reference to the flowmeter 100 shown in FIGS. 1, 2a, and 2b and a flowchart 1000 shown in FIG. 10. Those skilled in the art will readily be able to adapt the method for use with the embodiments shown in FIGS. 3–9c.

Firstly, a no-flow condition is established in the flow tube 224 at an ambient temperature (step 1002). Next, the predetermined overheat factor 240 is established (step 1004). Then, with the calibration mode switch set to select the temperature calibration factor 258 (position 0), the temperature calibration factor 258 is adjusted to provide a predetermined bridge signal 120 (for example, 3 Volts in the preferred embodiment) (step 1006). Next, a predetermined calibration flow rate of the fluid in the flow tube 224 is established at a first predetermined temperature (step 1008). The predetermined calibration flow rate may be, for example, a flow rate within a typical operating range of the flowmeter or no-flow. The flowmeter 100 is then operated sequentially with the fluid at two or more predetermine temperatures at the predetermine flow rate and a respective temperature calibration factor is determined at each predetermined temperature (steps 1008 to 1016). A flow bridge signal 112 at the first predetermined temperature and calibration flow rate is determined using the same temperature calibration factor as determined is step 1006 (step 1010). For at least one more. (n=2 to m) predetermined temperatures, adjust the temperature calibration factor 258 so that the value of the flow bridge signal 112 is the same as the value of the flow bridge signal determined in step 1010 (steps 1014,1014a,1014b) Next, determine parameters of the function 254 using the respective values of the temperature calibration factor 258 and values of the temperature (step 1016). The parameters may be determined, for example, using a least squares method of curve fitting or any other method known in the art. Then, with the calibration mode switch 260 set to select the temperature correction factor 256, the flowmeter 10 is sequentially operated at each predetermined temperature of the fluid used in steps 1008 and 1014 a respective flow bridge signal 112 is determined (steps 1018,1018a,1018b). Next, a value of bridge signal error is determined (step 1020). If the value of bridge signal error is less than a predetermined value then the method for calibrating the flowmeter 100 is finished, otherwise the method is repeated starting at step 1002 (step 1022).

Figure 11:
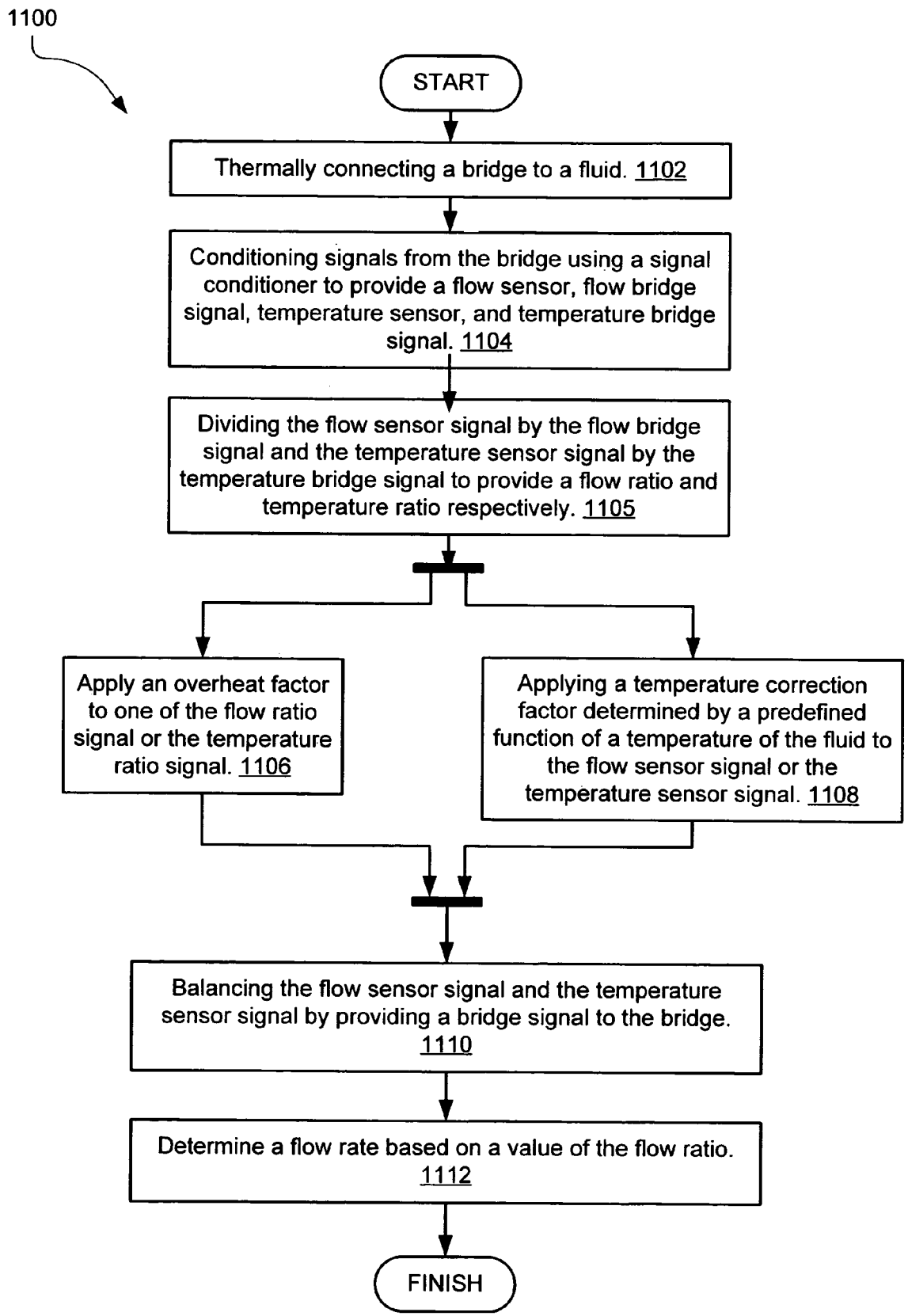
FIG. 11 is a flowchart of a method of determining a flow rate in accordance with the present invention.

According to the present invention there is also provided a method for determining a flow rate of the fluid. A preferred embodiment of the method will be described with a reference to the flow meter 100 shown in FIG. 1, 2a, and 2b and a flowchart 1100 shown in FIG. 11. Those skilled in the art will readily be able to adapt the method for use with the embodiments shown in FIGS. 3–9c.

Firstly, the bridge 102 is thermally connected to a fluid in, for example, a flow tube 224 (step 1102). Then, signals 108,110 from the bridge 102 are conditioned using a signal conditioner 104 to provide a flow bridge signal 112, a flow sensor signal 114, a temperature bridge signal 116, and a temperature sensor signal 118 (step 1104). An overheat factor 240 is applied to the temperature sensor signal 116 (FIG. 2b) or the flow sensor signal 114 (FIG. 6) (step 1106). Concurrently with step 1106, a temperature ratio 252 that is a ratio of the temperature sensor signal 116 and the temperature bridge signal 118 is determined. A temperature correction factor 256 is determined using the temperature ratio 252 and a predetermined function 254 (step 1108). The temperature correction factor 256 is applied to the temperature sensor signal 116 (FIG. 2b) or the flow sensor signal 114 (FIG. 6). Then, the bridge signal 120 is adjusted so that the flow sensor signal 114 and the temperature sensor' signal 246 are substantially equal. Finally, a flow rate of the fluid in the flow tube 224 is determined using the flow bridge signal 112.

Figure 10:
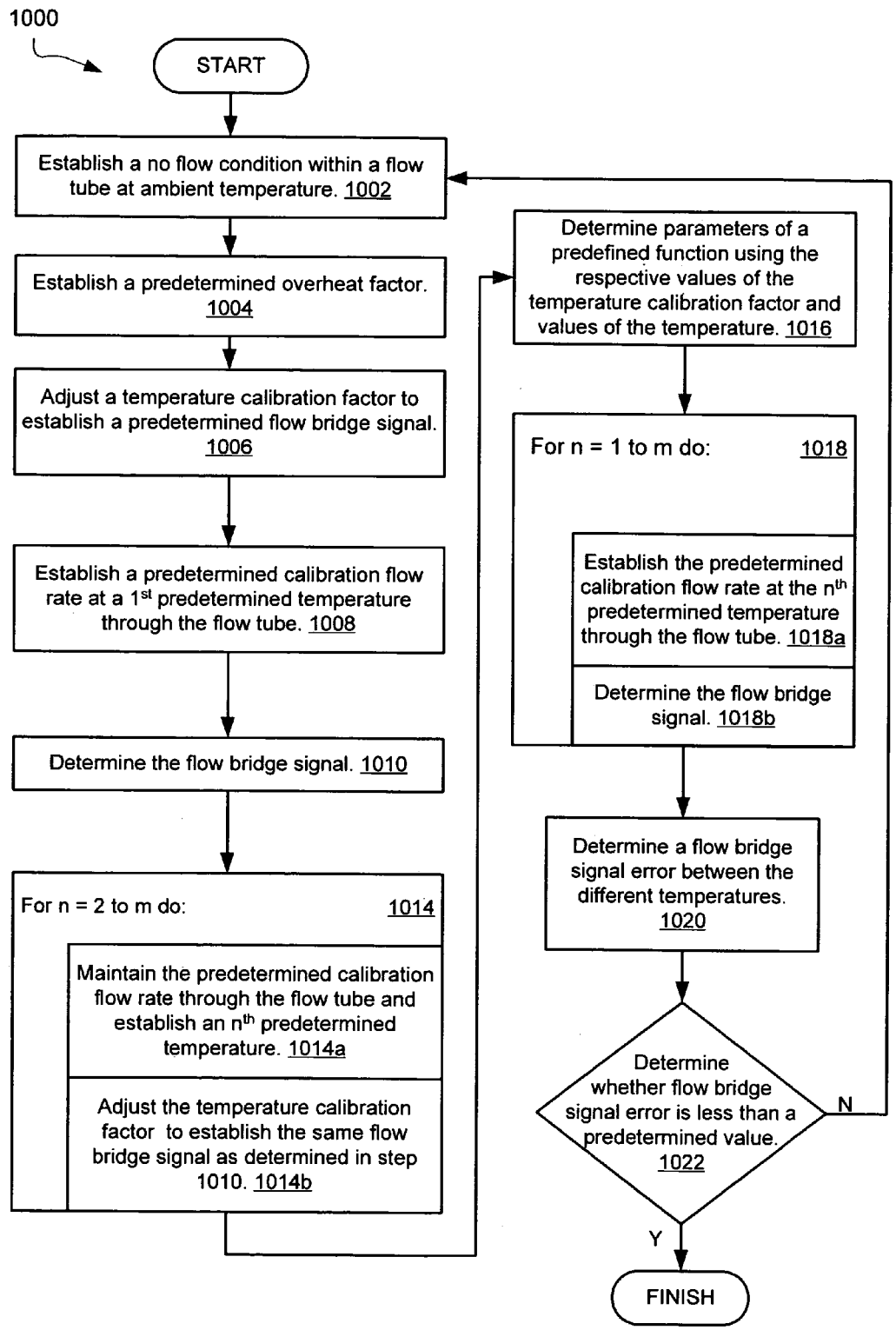
FIG. 10 is a flowchart of a method of calibrating a flowmeter in accordance with the present invention.
Figure 12:
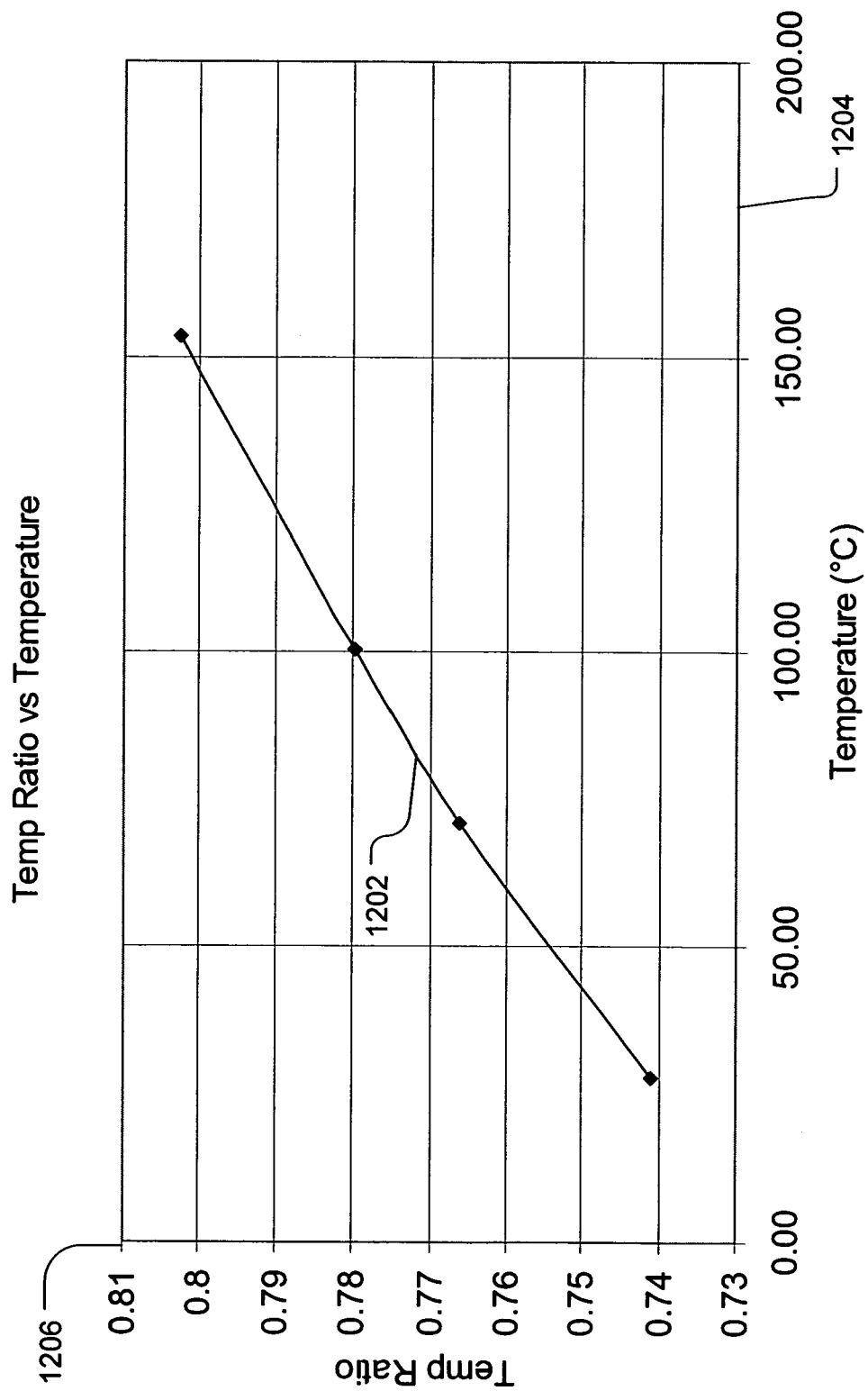
FIG. 12 is a graph of a temperature ratio versus a temperature of an exemplary embodiment of the flowmeter shown in FIGS. 1, 2a, and 2b.
Figure 13:
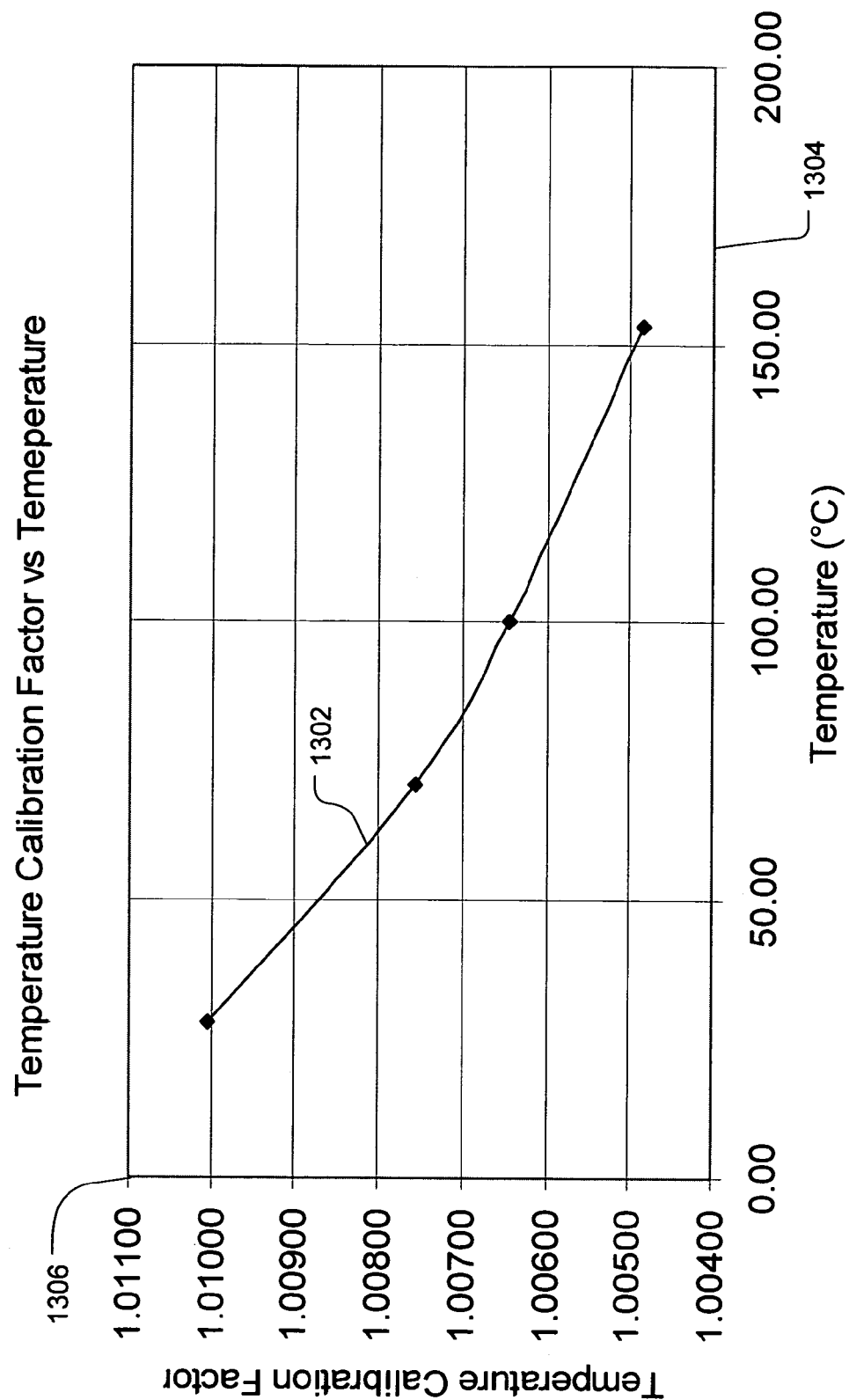
FIG. 13 is a graph of a temperature calibration factor versus the temperature of an exemplary embodiment of the flowmeter shown in FIGS. 1, 2a, and 2b.
Figure 14:
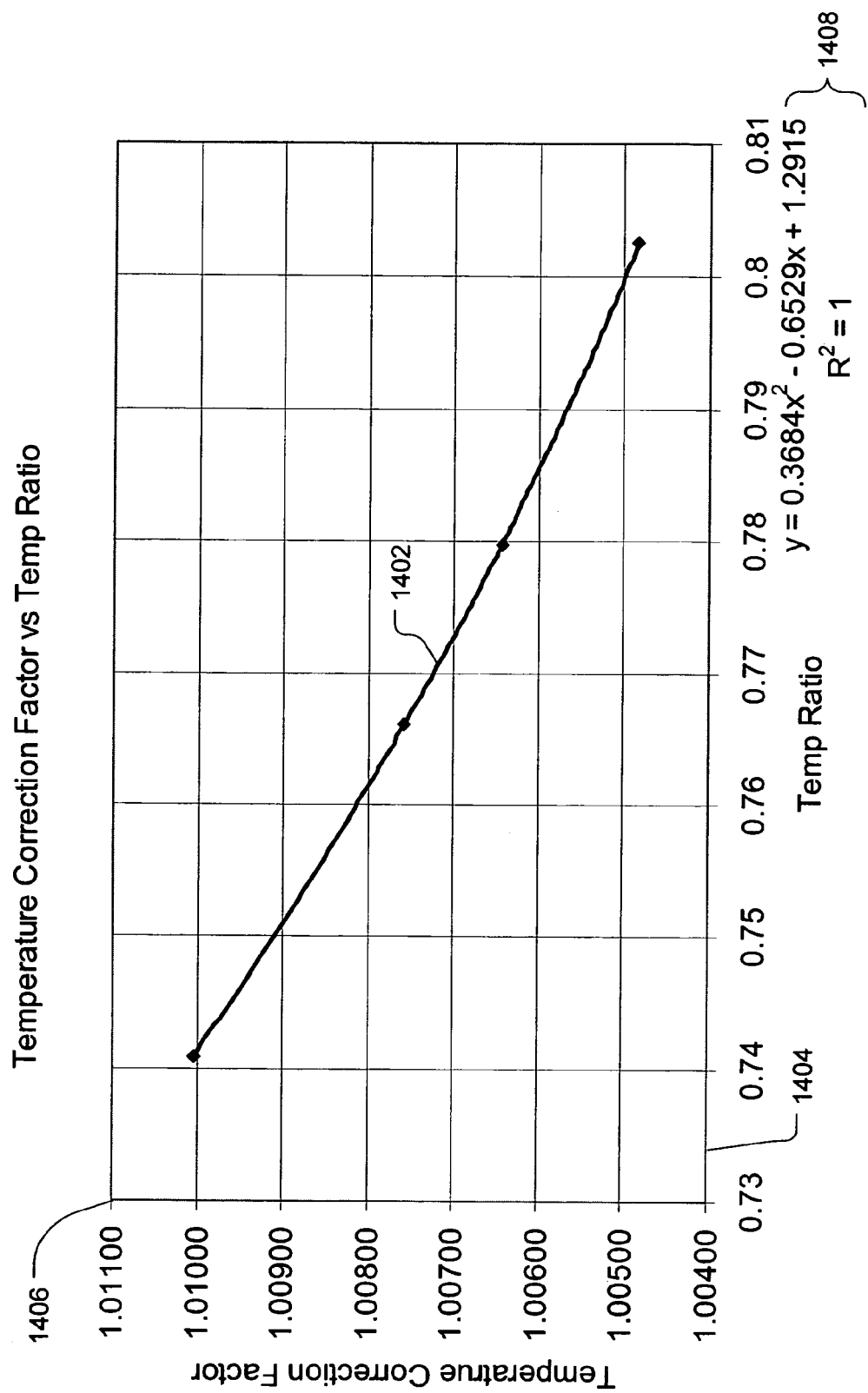
FIG. 14 is a graph a temperature correction factor versus the temperature ratio of an exemplary embodiment of the flowmeter shown in FIGS. 1, 2a, and 2b.

FIGS. 12, 13, and 14 show graphs of exemplary signals of the embodiment shown in FIGS. 1, 2a, and 2b with respect to the method of the calibration the flowmeter 100 shown in FIG. 10. The graphs shown in FIGS. 12 and 13 represent results of the steps 1014,1014a, and 1014b of the method shown in FIG. 10 (m=4 in this example). FIG. 12 shows a graph 1202 of the temperature ratio 252 (FIG. 2b) versus a temperature of the fluid in the flow tube 224 (FIG. 1) wherein an x-axis 1204 represents temperature in ° C. and a y-axis represents the temperature ratio 252 in dimensionless units. FIG. 13 shows a graph 1302 of the temperature calibration factor 258 (FIG. 2b) versus the temperature of the fluid in the flow tube 224 (FIG. 1) wherein an x-axis 1304 represents temperature in ° C. and a y-axis 1306 represents the temperature calibration factor 258. FIG. 14 represents results of step 1016 of the method shown in FIG. 10. FIG. 14 shows a graph 1402 of the temperature correction factor 256 versus the temperature ratio 252 wherein an x-axis 1404 represents the temperature ratio 252 in dimensionless units and a y-axis 1406 represents the temperature correction factor 256 also in dimensionless units. A second order polynomial function and coefficient of determination ($R^2$) 1408 determined using a least-squares method are shown indicating excellent accuracy over a wide temperature range (28° C. to 154° C.).

From the foregoing discussion, specifically that both the temperature correction factor and the overheat factors are functions of the temperature, wherein Y=F(X) is a divider correction, it is implicit that the bridge is being "disproportionately balanced", as opposed to proportional bridge balancing which is known in the art. Disproportionate balancing of the bridge means that there is a changing ratio of proportionality on the respective resistive elements on each divider as the temperature changes. In other words, the ratio of proportionality of the respective resistive elements on the bridge changes disproportionately with temperature.

The embodiment(s) of the invention described above are intended to be exemplary only. The scope of the invention is therefore intended to be limited solely by the scope of the appended claims.

I claim:

1. A thermal mass flowmeter comprising:
    means for providing a flow ratio signal and a temperature ratio signal, the flow ratio signal and the temperature ratio signal having a ratio of proportionality that changes with temperature;
    means for applying an overheat factor to the flow ratio signal or the temperature ratio signal;
    means for applying a temperature correction factor to the flow ratio signal or the temperature ratio signal, the temperature correction factor being determined by a predefined function of a temperature of a fluid; and
    means for disproportionately balancing the flow ratio signal and temperature ratio signal when the ratio of proportionality changes with temperature.

2. The thermal mass flowmeter as claimed in claim 1, wherein the means for providing the flow ratio signal and the temperature ratio signal comprises:
    a bridge thermally connectable to the fluid;
    a signal conditioner for conditioning signals from the bridge to provide a flow sensor signal, a flow bridge signal, a temperature sensor signal and a temperature bridge signal; and
    means for dividing the flow sensor signal by the flow bridge signal and means to divide the temperature sensor signal by the temperature bridge signal to provide the flow ratio signal and temperature ratio signal respectively.

3. The thermal mass flowmeter as claimed in claim 2, wherein the bridge is a Wheatstone bridge having a flow ratio resistive divider and a temperature ratio resistive divider having a ratio of proportionality that changes with temperature.

4. The thermal mass flowmeter as claimed in claim 2, wherein the bridge comprises:
    a flow reference impedance and a flow sensor resistance temperature detector (RTD) for dividing a bridge signal according to a relative impedance of the flow reference impedance and the flow sensor RTD; and
    a temperature reference impedance and a temperature sensor RTD for dividing the bridge signal according to a relative impedance of the temperature reference impedance and the temperature sensor RTD.

5. The thermal mass flowmeter as claimed in claim 4, wherein the bridge further comprises:
    a thermometer for determining the temperature of the fluid.

6. The thermal mass flowmeter as claimed in claim 4, wherein the flow sensor RTD is a platinum RTD having a positive temperature coefficient and the temperature sensor RTD is a platinum RTD having a positive temperature coefficient.

7. The thermal mass flowmeter as claimed in claim 4, wherein the temperature sensor RTD is a thermistor having a positive or negative temperature coefficient and the flow sensor RTD is a thermistor having a positive or negative temperature coefficient.

8. The thermal mass flowmeter as claimed in claim 4, wherein a ratio of a value of the flow reference impedance to a value of the flow sensor RTD is substantially equal to a ratio of a value of the temperature reference impedance to a value of the temperature sensor RTD at a predetermined ambient temperature.

9. The thermal mass flowmeter as claimed in claim 4, wherein a sum of a value of the flow sensor RTD plus a value of the flow reference impedance is substantially less than a sum of a value of the temperature sensor RTD plus a value of the temperature reference impedance.

10. The thermal mass flowmeter as claimed in claim 4, wherein the bridge comprises a three-wire connection for connecting the flow sensor RTD to the signal conditioner.

11. The thermal mass flowmeter as claimed in claim 10, wherein the signal conditioner comprises means for canceling losses in the three-wire connection and means for providing the flow bridge signal and the flow sensor signal.

12. The thermal mass flowmeter as claimed in claim 4, wherein the bridge comprises a three-wire connection for connecting the temperature sensor RTD to the signal conditioner.

13. The thermal mass flowmeter as claimed in claim 12, wherein the signal conditioner comprises means for canceling losses in the three-wire connection and means for providing the temperature bridge signal and the temperature sensor signal.

14. The thermal mass flowmeter as claimed in claim 4, wherein the bridge comprises a four-wire connection for connecting the flow sensor RTD to the signal conditioner.

15. The thermal mass flowmeter as claimed in claim 4, wherein the bridge comprises a four-wire connection for connecting the temperature sensor RTD to the signal conditioner.

16. The thermal mass flowmeter as claimed in claim 15, wherein the signal conditioner comprises means for canceling loses in the four-wire connection and means for providing a temperature bridge signal and a temperature sensor signal.

17. The thermal mass flowmeter as claimed in claim 14, wherein the signal conditioner comprises means for canceling losses in the four-wire connection and means for providing the flow bridge signal and the flow sensor signal.

18. The thermal mass flowmeter as claimed in claim 4, wherein the bridge comprises a three-wire connection for connecting, via first and second wires, the flow sensor RTD to the signal conditioner, wherein the three-wire connection further includes a third wire connected to a ground side of the flow sensor RTD.

19. The thermal mass flowmeter as claimed in claim 4, wherein the bridge comprises a three-wire connection for connecting, via first and second wires, the temperature sensor RTD to the signal conditioner, wherein the three-wire connection further includes a third wire connected to a ground side of the temperature sensor RTD.

20. The thermal mass flowmeter as claimed in claim 2, wherein the bridge comprises:
a flow reference impedance and a flow sensor resistance temperature detector (RTD) for dividing a bridge signal according to a relative impedance of the flow reference impedance and the flow sensor RTD; and
a thermometer for determining the temperature of the fluid and providing a temperature signal.

21. The thermal mass flowmeter as claimed in claim 20, wherein the means for balancing comprises means for converting the temperature signal to the temperature ratio signal.

22. The thermal mass flowmeter as claimed in claim 20, wherein the flow bridge signal substantially represents a signal of the flow reference impedance.

23. The thermal mass flowmeter as claimed in claim 20, wherein the flow bridge signal substantially represents a signal of the flow reference impedance plus a signal of the flow sensor RTD.

24. The thermal mass flowmeter as claimed in claim 20, wherein the temperature bridge signal substantially represents a signal of the temperature reference impedance.

25. The thermal mass flowmeter as claimed in claim 20, wherein the temperature bridge signal substantially represents a signal of the temperature reference impedance plus a signal of the temperature sensor RTD.

26. The thermal mass flowmeter as claimed in claim 2, wherein the flow bridge signal is a substantially linear function of a flow rate of the fluid.

27. The thermal mass flowmeter as claimed in claim 2, wherein the means for balancing comprises means for converting the flow bridge signal for providing a flow rate signal.

28. The thermal mass flowmeter as claimed in claim 1, wherein the means for balancing the flow ratio signal and the temperature ratio signal comprises means for substituting a predefined virtual temperature signal for the temperature ratio signal.

29. The thermal mass flowmeter as claimed in claim 1, wherein the means for balancing the flow ratio signal and the temperature ratio signal comprises means for applying a predetermined gas compensation factor to the flow ratio signal or the temperature ratio signal, whereby the gas compensation factor disproportionately balances the flow ratio signal and the temperature ratio signal by correcting for variations in gas composition.

30. The thermal mass flowmeter as claimed in claim 1, wherein the temperature ratio signal is a substantially linear function of the temperature of the fluid.

31. The thermal mass flowmeter as claimed in claim 1, further comprising means for converting the temperature ratio signal for providing a temperature signal.

32. The thermal mass flowmeter as claimed in claim 1, wherein a type of the predefined function is chosen from a list consisting of linear, quadratic, cubic, and piece-wise linear.

33. A method of calibrating a thermal mass flowmeter, the method comprising the steps of:
sequentially operating the flowmeter with a fluid at two or more predetermined temperatures and at a predetermined fluid flow rate;
determining respective values of a temperature calibration factor at each temperature; and
determining parameters of a function using the respective values of the temperature calibration factor and values of the temperature,
wherein the function defines a relationship between the temperature of the fluid and a temperature correction factor, and
wherein the step of determining respective values of the temperature calibration factor comprises a step of balancing a flow ratio signal and a temperature ratio signal at each temperature using the respective temperature calibration factor.

34. The method as claimed in claim 33, wherein the step of sequentially operating the flowmeter comprises a step of sequentially operating the flowmeter with a fluid at two or more predetermined temperatures and at a no-flow fluid rate.

35. The method as claimed in claim 33, wherein the step of determining respective values of the temperature calibration factor comprises a step of applying the respective temperature calibration factor to the flow ratio signal or the temperature ratio signal.

36. The method as claimed in claim 33, wherein the step of determining respective values of the temperature calibration factor comprises a step of applying an overheat factor to the flow ratio signal or the temperature ratio signal.

37. The method as claimed in claim 33, wherein the step of determining respective values of the temperature calibration factor comprises a step of adjusting the flow signal or temperature signal using a gas compensation factor.

38. The method as claimed in claim 33, wherein the step of sequentially operating the flowmeter with a fluid at two or more temperatures comprises a step of determining the flow rate using a bridge signal.

39. The method as claimed in claim 33, wherein the step of determining respective values of the temperature calibration factor and values of the temperature comprises a step of determining the values of the temperature using a ratio of a temperature sensor signal and a bridge signal.

40. The method as claimed in claim 33, wherein the step of determining respective values of the temperature calibration factor and values of the temperature comprises a step of determining the values of the temperature using a temperature sensor signal.

41. The method as claimed in claim 33, wherein the step of determining parameters of a function comprises a step of curve fitting a polynomial using a least-squares method to the values of the temperature calibration factor.

42. The method as claimed in claim 33, wherein the step of determining parameters of a function comprises a step of fitting a piece-wise linear function to the values of the temperature calibration factor.

43. The method as claimed in claim 33, further comprising steps of:
sequentially operating the thermal mass flowmeter with the fluid at two or more predetermined temperatures;
determining a value of a respective bridge signal at each temperature; and
determining a amount of error between two different values of the bridge signal.

44. The method as claimed in claim 43, further comprising a steps of determining if the amount of error is less than a predetermined value.

45. A method for determining a flow rate of a fluid comprising the steps of:
thermally connecting a bridge to the fluid;
conditioning signals from the bridge using a signal conditioner to provide a flow sensor signal and a temperature sensor signal, wherein a ratio of proportionality between the flow sensor signal and the temperature sensor signal changes over a temperature range;
applying an overheat factor to the flow sensor signal or the temperature sensor signal wherein the overheat factor corrects for a changing ratio of proportionality between the flow sensor signal and the temperatuee sensor signal resulting from changes in temperature;
applying a temperature correction factor, determined by a predefined function of a temperature of the fluid, the temperature correction factor being applied to the flow sensor signal or the temperature sensor signal; and
balancing the ratio of proportionality between the flow sensor signal and the temperature sensor signal as the ratio of proportionality changes with temperature by providing a bridge signal to the bridge.

46. The method as claimed in claim 45, wherein the step of thermally connecting a bridge to the fluid comprises a step of thermally connecting a disproportionately controlled and balanced Wheatstone bridge to the fluid wherein two dividers of the Wheatstone bridge have a ratio of proportionality that changes over a temperature range.

47. The method as claimed in claim 45, wherein the step of conditioning signals using a signal conditioner comprises steps of canceling losses in a three-wire connection and providing flow bridge signal and the flow sensor signal.

48. The method as claimed in claim 47, further comprising a step of determining the flow rate using the disproportionately balanced flow bridge signal.

49. The method as claimed in claim 45, wherein the step of conditioning signals using a signal conditioner comprises steps of canceling losses in a three-wire connection and providing a temperature bridge signal and the temperature sensor signal.

50. The method as claimed in claim 45, wherein the step of conditioning signals using a signal conditioner comprises steps of canceling losses in a four-wire connection and providing a flow bridge signal and a flow sensor signal.

51. The method as claimed in claim 45, wherein the step of conditioning signals using a signal conditioner comprises steps of canceling losses in a four-wire connection and providing a temperature bridge signal and a temperature sensor signal.

52. The method as claimed in claim 45, wherein the step of balancing the flow sensor signal and the temperature sensor signal circuit comprises a step of substituting a predefined virtual temperature signal for the temperature sensor signal.

53. The method as claimed in claim 45, wherein the step of balancing the flow sensor signal and the temperature sensor signal comprises a step of adjusting the flow signal or the temperature signal by a predetermined gas compensation factor.

54. The method as claimed in claim 45, wherein the step of applying the temperature correction factor to the flow sensor signal or the temperature sensor signal comprises a step of determining the temperature of the fluid using a ratio of the temperature sensor signal and a temperature bridge signal.

55. The method as claimed in claim 45, wherein the step of applying the temperature correction factor to the flow sensor signal or the temperature sensor signal comprises a step of determining the temperature of the fluid using a thermometer.

56. The method as claimed in claim 45, further comprising a step of determining the flow rate using the disproportionately balanced bridge signal.

57. The method as claimed in claim 45, further comprising a step of determining the temperature of the fluid using the temperature sensor signal.

58. The method as claimed in claim 45, further comprising a step of determining the temperature of the fluid using a thermometer.

* * * * *